US012508904B2

(12) United States Patent
Sasanuma et al.

(10) Patent No.: US 12,508,904 B2
(45) Date of Patent: Dec. 30, 2025

(54) DISPLAY CONTROL APPARATUS AND DISPLAY CONTROL METHOD

(71) Applicant: Nissan Motor Co., Ltd., Yokohama (JP)

(72) Inventors: Yasutomo Sasanuma, Kanagawa (JP); Jun Ueda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 252 days.

(21) Appl. No.: 18/563,405

(22) PCT Filed: Jun. 3, 2021

(86) PCT No.: PCT/JP2021/021223
§ 371 (c)(1),
(2) Date: Nov. 22, 2023

(87) PCT Pub. No.: WO2022/254664
PCT Pub. Date: Dec. 8, 2022

(65) Prior Publication Data
US 2024/0217340 A1    Jul. 4, 2024

(51) Int. Cl.
*G06F 3/048* (2013.01)
*B60H 1/00* (2006.01)
(Continued)

(52) U.S. Cl.
CPC ......... *B60K 35/10* (2024.01); *B60H 1/00985* (2013.01); *G06F 3/04817* (2013.01);
(Continued)

(58) Field of Classification Search
CPC .............. B60K 35/10; B60K 2360/111; B60K 2360/113; B60K 2360/119;
(Continued)

(56) References Cited

U.S. PATENT DOCUMENTS

| 11,040,620 B2 * | 6/2021 | Jang ........................ B60K 35/60 |
| 2012/0092251 A1 * | 4/2012 | Hashimoto ............ B60K 35/10 |
| | | 345/156 |

(Continued)

FOREIGN PATENT DOCUMENTS

| CN | 110352281 B | * | 3/2022 | ................ E02F 3/32 |
| JP | 2015-20640 A | | 2/2015 | |
| JP | 2015-58841 A | | 3/2015 | |
| JP | 2020-175817 A | | 10/2020 | |
| WO | 2011/013514 A1 | | 2/2011 | |

*Primary Examiner* — Rashawn N Tillery
(74) *Attorney, Agent, or Firm* — GLOBAL IP COUNSELORS, LLP

(57) ABSTRACT

A display control device for controlling a display screen image of a touch-panel display from both a passenger seat and a driver's seat of a vehicle. The display control device includes a controller for controlling the display screen image based on a touch manipulation performed in regard to the touch-panel display by the user. The controller outputs a first control command for displaying a home screen image including a passenger seat icon and a driver's seat icon, and outputs a second control command for displaying a settings screen image pertaining to the passenger seat and the driver's seat. The driver's seat icon includes a set temperature for the driver's seat. The passenger seat icon includes a set temperature for the passenger seat. The passenger seat settings screen image and the driver's seat settings screen image being arranged on the display screen image so as to have bilateral symmetry.

16 Claims, 9 Drawing Sheets

(51) Int. Cl.
*B60K 35/10* (2024.01)
*G06F 3/04817* (2022.01)
*G06F 3/04847* (2022.01)
*G06F 3/0488* (2022.01)

(52) U.S. Cl.
CPC ........ *G06F 3/04847* (2013.01); *G06F 3/0488* (2013.01); B60K 2360/111 (2024.01); B60K 2360/113 (2024.01); B60K 2360/119 (2024.01); B60K 2360/1438 (2024.01); B60K 2360/166 (2024.01); B60K 2360/171 (2024.01)

(58) Field of Classification Search
CPC ...... B60K 2360/1438; B60K 2360/166; B60K 2360/171; B60K 35/00; B60H 1/00985; B60H 1/00; G06F 3/04817; G06F 3/04847; G06F 3/0488; G06F 3/04886
See application file for complete search history.

(56) References Cited

U.S. PATENT DOCUMENTS

| | | | |
|---|---|---|---|
| 2015/0281626 A1* | 10/2015 | Sirpal | G06F 3/0484 348/564 |
| 2015/0317057 A1* | 11/2015 | Choi | G01C 21/3673 715/757 |
| 2017/0186402 A1* | 6/2017 | Jeon | F24F 11/523 |
| 2019/0244533 A1* | 8/2019 | Kim | G05D 1/0202 |
| 2020/0167116 A1* | 5/2020 | Manabe | B60K 35/656 |
| 2020/0272325 A1* | 8/2020 | Furumoto | B60K 35/10 |
| 2021/0019042 A1* | 1/2021 | Kwak | B60N 2/5685 |
| 2023/0027012 A1* | 1/2023 | Kwak | B60K 35/22 |
| 2023/0168914 A1* | 6/2023 | Han | G06F 9/45558 |
| 2023/0305687 A1* | 9/2023 | Saito | G06F 3/04847 |
| 2024/0239197 A1* | 7/2024 | Nagasawa | B60K 35/81 |
| 2024/0278616 A1* | 8/2024 | Mizuno | B60H 1/00 |

* cited by examiner

DISPLAY CONTROL APPARATUS AND DISPLAY CONTROL METHOD

CROSS-REFERENCE TO RELATED APPLICATIONS

This application is a U.S. national stage application of International Application No. PCT/JP2021/021223, filed on Jun. 3, 2021.

BACKGROUND

Technical Field

The present invention relates to a display control device and a display control method for controlling a display screen image of a display mounted in a vehicle.

Background Information

An onboard adjustment input device via which input is accepted into a temperature adjustment device mounted in a vehicle is known from the prior art (Japanese Laid-Open Patent Application No. 2020-175817-Patent Document 1). The onboard adjustment input device comprises a display unit, an input detection unit, a display control unit, and an input content acquisition unit. The input detection unit has a manipulation surface associated with a first position on a display surface of the display unit and detects a second position on the manipulation surface that is manipulated for input. The display control unit controls the display unit. The input content acquisition unit acquires, as input content, display content displayed at the first position corresponding to the second position detected by an input position detection unit. The temperature adjustment device includes a contact temperature adjustment device for contacting part of the body of a passenger and implementing at least one of warming and cooling on the contacted part. If an input manipulation performed in regard to the same display content is detected by the input position detection unit at least a prescribed number of times within a prescribed first period, the display control unit displays, as display content on the display surface, a contact temperature adjustment input content displayed depiction that represents input content for the contact temperature adjustment device. A contact temperature adjustment input screen image including the contact temperature adjustment input content is displayed within a new window generated in a temperature adjustment input screen image.

SUMMARY

However, in the onboard adjustment input device described above, because the contact temperature adjustment input screen image is positioned approximately at the center of the display surface of the display unit, a problem is presented in that input to the screen image is difficult for a user while the user is seated in a seat, and manipulability is low.

A problem to be addressed by the present invention is to provide a display control device and a display control method with which it is possible to improve manipulability even in a state in which a user is seated in a seat.

According to the present invention: a first control command for displaying a home screen image including a right-seat icon associated with a right seat of a vehicle and a left-seat icon associated with a left seat of the vehicle is outputted to a touch-panel display that can be manipulated by a user from both the right seat and the left seat; when one seat icon from among the right-seat icon and the left-seat icon is manipulated, a second control command for displaying a settings screen image pertaining to one seat from among the right seat and the left seat is outputted, the one seat corresponding to the manipulated one seat icon; the one seat corresponds to the one seat icon that is manipulated in the home screen image; and the settings screen image includes a displayed depiction via which a control item relating to temperature control for the one seat can be inputted by the user, and is positioned closer to the one seat than to the other seat from among the right seat and the left seat on the display screen image. The above problem is thereby solved.

The present invention makes it possible to improve manipulability even in a state in which a user is seated in a seat.

BRIEF DESCRIPTION OF THE DRAWINGS

Referring now to the attached drawings which form a part of this original disclosure.

DETAILED DESCRIPTION OF EMBODIMENTS

Figure 1:
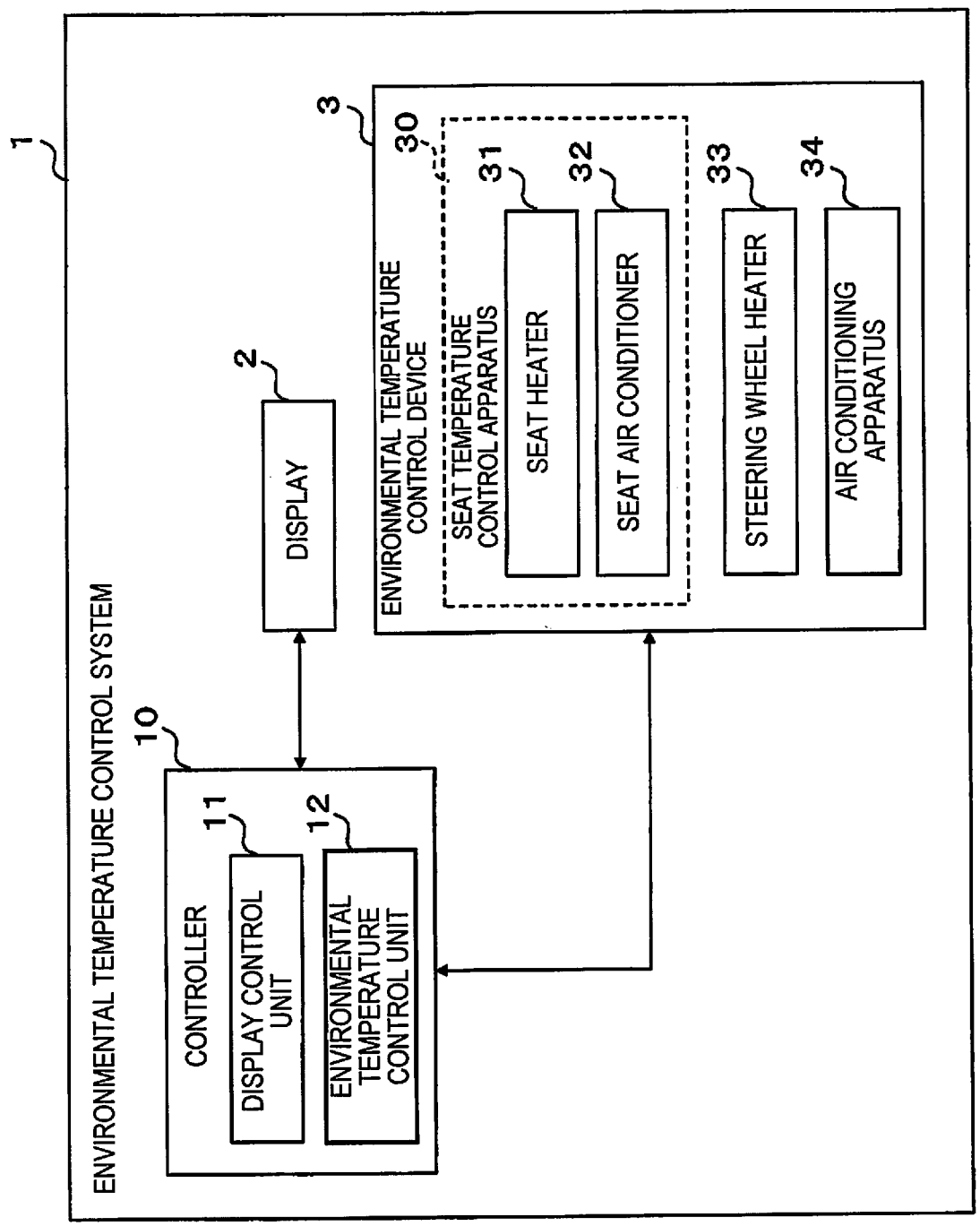
FIG. 1 is a block diagram showing an example of an environment temperature control system according to the present embodiment.

A preferred embodiment of the display control device and display control method according to the present invention is described below based on the drawings. As shown in FIG. 1, the display control device according to the present embodiment is realized as part of an environment temperature control system. FIG. 1 is a block diagram showing an example of an environment temperature control system 1 according to the present embodiment. The environment temperature control system 1 is a system for controlling an environment temperature inside a vehicle cabin. In the present embodiment, the display control device and display control method according to the present invention are described using an example of a "right-hand-steering-wheel vehicle," in which a vehicle steering wheel is positioned on a right side relative to a vehicle advancement direction (progress direction). The vehicle is described as including: a driver's seat positioned on the right side relative to the vehicle advancement direction; a passenger seat positioned on a left side relative to the vehicle advancement direction; and a back seat on which a plurality of occupants can sit, the back seat being located behind the driver's seat and the passenger seat. The driver's seat and the passenger seat are provided set apart from one another. There are no particular limitations as to the configuration of the back seat; the back seat can have a configuration in which seats are individually provided for each occupant or can have a configuration in which a plurality of occupants can sit on one laterally long seat. The vehicle preferably accommodates two or more occupants. The display control device and display control method according to the present invention can also be applied to a vehicle having no back seat, or to a vehicle provided with a third row of back seats in addition to a first row and a second row of seats, where the first row includes the driver's seat and the passenger seat, and the second row includes the back seat.

As shown in FIG. 1, the environment temperature control system 1 comprises a display 2, an environment temperature control device 3, and a controller 10. Among these, for example, the controller 10 can constitute the display control device according to the present embodiment of the present invention. The configurations in the environment temperature control system 1 are connected by, e.g., an onboard network such as a controller area network (CAN) or a local interconnect network (LIN) in order to transmit and receive information to and from each other. The environment temperature control system 1 according to the present embodiment accepts a touch manipulation using the touch-panel display 2 and controls the environment temperature control device 3 based on the touch manipulation. The environment temperature control system 1 can adjust the environment temperature inside the vehicle cabin according to an operation of the environment temperature control device 3 that is based on the touch manipulation. The display control device of the present invention controls a display screen image of the display 2 and improves manipulability relating to controlling the environment temperature inside the vehicle cabin. Additionally, the display control device of the present invention improves visibility of a displayed depiction relating to the environment temperature inside the vehicle cabin in addition to improving manipulability.

The display 2 is a touch-panel display and is mounted in the vehicle. The touch-panel display 2 is provided with a pressure-sensitive sensor and detects pressing force applied to the display during a contact manipulation from a resistance value, a voltage, or the like. There are no particular limitations as to the mechanism of the pressure-sensitive sensor; a mechanism of pressure-sensitive sensors that was known at the time of filing can be suitably used. Additionally, the touch panel is not limited to being pressure-sensitive; capacitive or other formats can also be employed. There are no particular limitations as to the display 2 in terms of type, provided that the display 2 is a touch-panel display. The display 2 can be a liquid crystal display or an organic electroluminescent (organic EL, OEL) display.

Figure 2:
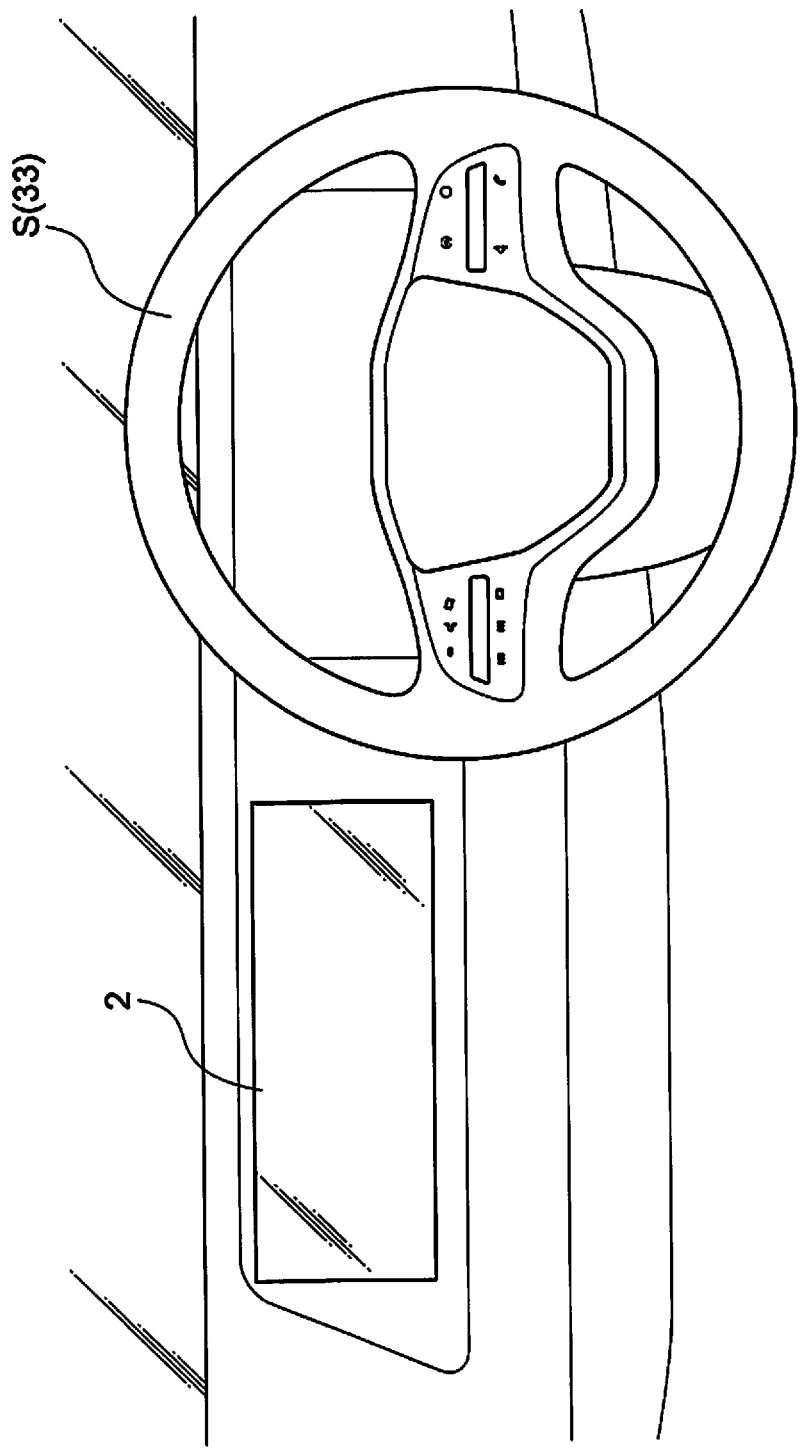
FIG. 2 is an example of a front view of a dashboard provided with the display in FIG. 1.

FIG. 2 is an example of a front view of a vicinity of a dashboard provided with the display in FIG. 1. As shown in FIG. 2, the display 2 (center display) is located at a front portion of the dashboard. The display 2 is disposed forward of the driver's seat and the passenger seat such that hands of occupants can reach the display 2 from both the driver's seat and the passenger seat. Additionally, the display 2 is disposed between the driver's seat and the passenger seat. In FIG. 2, the display 2 is positioned leftward of a steering wheel S relative to a longitudinal direction of the vehicle and is provided at a position at which both an occupant seated in the driver's seat (also referred to below as a "driver") and an occupant seated in the passenger seat (also referred to below as a "passenger-seat occupant") can touch the display 2. Specifically, both the driver and the passenger-seat occupant can touch and manipulate the display 2, and therefore the display 2 can be jointly accessed by the driver and the passenger-seat occupant.

The driver or the passenger-seat occupant inputs manipulation content for the environment temperature control device 3 (described later) to the display 2 through touch manipulations for touching the display 2 using a finger or a manipulation instrument that can be used instead of a finger. The touch manipulation involves touching an icon or button displayed on the display 2 using a finger or the like. The touch manipulation includes tapping (touching the screen image once), double-tapping (touching the screen image twice), long-tapping (pressing the screen image for an extended period), swiping (sliding a finger that is touching the screen image while keeping the finger on the screen image (tracing with the finger)), flicking (moving a finger that is touching the screen image so as to rapidly flick on the screen image), pinching in or out (touching the screen image using two fingers and bringing the two fingers closer to one another or further from one another), or the like. The touch manipulation can involve directly touching the display screen image of the display 2 or "hovering" over the screen image, i.e., bringing the finger or the like close to the display screen image. The method for manipulation using the touch manipulation is not limited to the above; other methods can be employed.

When the driver or the passenger-seat occupant performs a touch manipulation on the display 2, the display 2 detects a position on the display screen image at which the touch manipulation is performed and outputs information pertaining to the detected position to the controller 10. One or a plurality of screen images displayed on the display 2 are controlled by the controller 10. A control command for displaying image data is inputted to the display 2 from the controller 10. The display 2 displays one or a plurality of screen images based on the image data.

The environment temperature control device 3 is used for controlling the environment temperature inside the vehicle cabin. As shown in FIG. 1, the environment temperature control device 3 includes a seat temperature control apparatus 30, a steering wheel heater 33, and an air conditioning apparatus 34.

The seat temperature control apparatus 30 is provided inside the seats of the vehicle and includes a seat heater 31 and a seat air conditioner 32, as shown in FIG. 1. The seat temperature control apparatus 30 is provided to each seat of the vehicle. One seat temperature control apparatus 30 is shown in FIG. 1, but the seat temperature control apparatus 30 is provided to each of the driver's seat, the passenger seat, and the back seat. There are no particular limitations as to the number of seat temperature control apparatuses 30 provided to the back seat.

The seat heater 31 is provided with a heating wire or other heat-radiating member and warms back-surface portions of an occupant sitting in the seat using heat radiated from the heat-radiating member. The heat-radiating member is, for example, incorporated into a seat cushion part (seat surface part) and a seat back part constituting the seat. The back-surface portions of the occupant include the back, hips, posterior, and legs of the occupant. The seat heater 31 is controlled by the controller 10. Examples of control commands outputted from the controller 10 to the seat heater 31 include a warming command and a set temperature. The seat heater 31 causes the heat-radiating member to radiate heat such that a surface temperature of the seat reaches a set temperature when, e.g., a control command including a warming command and the set temperature is inputted from the controller 10. There are no particular limitations as to the method for controlling the seat heater 31; a method that was known at the time of filing can be suitably used.

The seat air conditioner 32 is provided with a plurality of air vent openings and imparts a cooling sensation to the back-surface portions of the occupant sitting in the seat by venting air via the plurality of air vent openings. The air vent openings are provided, e.g., near a surface of the seat at the seat cushion part and the seat back part of the seat. The seat air conditioner 32 is provided with a blowing function and/or a dehumidification function. The seat air conditioner 32, e.g., blows cool air at a prescribed airflow volume from the air vent openings to impart a cooling sensation to the back-surface portions of the occupant. The seat air conditioner 32 also, e.g., removes humidity by suctioning (or expelling) air through the air vent openings to impart a cooling sensation to the back-surface portions of the occupant. The seat air conditioner 32 is controlled by the controller 10. Examples of control commands outputted from the controller 10 to the seat air conditioner 32 include a blowing command, a dehumidification command, a set airflow volume, and a set temperature. The seat air conditioner 32 blows out an airflow that is at a set temperature from the air vent openings at a set airflow volume when, for example, a control command including a blowing command, a set airflow volume, and a set temperature is inputted from the controller 10. The seat air conditioner 32 also suctions air through the air vent openings when, e.g., a control command including a dehumidification command is inputted from the controller 10. There are no particular limitations as to the method for controlling the seat air conditioner 32; a method that was known at the time of filing can be suitably used. In the description given below, the seat air conditioner 32 is described as being provided with at least a blowing function.

The steering wheel heater 33 is provided to the steering wheel of the vehicle. The steering wheel heater 33 is provided with a heating wire or other heat-radiating member incorporated into the steering wheel and warms hands of the driver touching the steering wheel using heat radiated from the heat-radiating member. The steering wheel heater 33 is controlled by the controller 10. Examples of control commands outputted from the controller 10 to the steering wheel heater 33 include a warming command and a set temperature. The steering wheel heater 33 causes the heat-radiating member to radiate heat such that a surface temperature of the steering wheel reaches a set temperature when, e.g., a control command including a warming command and the set temperature is inputted from the controller 10. There are no particular limitations as to the method for controlling the steering wheel heater 33; a method that was known at the time of filing can be suitably used.

The air conditioning apparatus 34 is an air conditioner system that adjusts the temperature, humidity, or the like of the air inside the vehicle cabin. The air conditioning apparatus 34 is configured from an air conditioning system including a compressor and other components and has, inter alia, an air outlet for blowing out air into the passenger seat space, and a defroster for defogging a windshield and/or a side window. The air outlet is provided to the dashboard or to a section below the dashboard. When provided to the dashboard, the air outlet is a front-surface blowout opening and is disposed such that an airflow is blown out toward front surfaces of the seats. When provided to a section below the dashboard, the air outlet is a lower-section blowout opening and is disposed such that an airflow is blown out toward lower sections of the seats. The airflow changes direction depending on a direction inside the blowout opening. The defroster has an outlet through which air is blown out along the glass windshield from a portion forward of the dashboard, the defroster outputting an airflow generated by the air conditioning system. The air conditioning apparatus 34 is controlled by the controller 10. Examples of control commands outputted from the controller 10 to the air conditioning apparatus 34 include a blowing command, a dehumidification command, a set temperature, a set airflow volume, and a set airflow direction. The air conditioning apparatus 34 blows out an airflow that is at a set temperature from the air outlet, which is set according to a set airflow direction, at a set airflow volume when, for example, a control command including a blowing command, a set temperature, a set airflow volume, and a set airflow direction is inputted from the controller 10. There are no particular limitations as to the method for controlling the air conditioning apparatus 34; a method that was known at the time of filing can be suitably used.

The controller 10 is configured from a computer provided with hardware and software and has, inter alia, a memory in which a program is saved and a CPU for executing the program saved in the memory. An MPU, a DSP, an ASIC, an FPGA, or the like can be used as an operation circuit instead of or in addition to the CPU. The controller 10 has, as function blocks, a display control unit 11 for controlling the display screen image of the display 2 and an environment temperature control unit 12 for controlling the environment temperature control device 3. The controller 10 realizes functions of the function blocks using the software stored in the memory. The controller 10 is not limited to the display control unit 11 and the environment temperature control unit 12; for example, a function for controlling an audio system, a function for controlling a navigation system, and other control blocks for controlling various systems present inside the vehicle cabin can also be provided. The controller 10 is not limited to controlling the display 2 and the environment temperature control device 3; other onboard apparatuses can also be controlled thereby. A variety of systems included in the vehicle are controlled by a plurality of ECUs, but FIG. 1 shows the plurality of ECUs in the form of the controller 10. The environment temperature control system 1 can be configured such that blocks other than the controller 10 have the other functions described above, provided that the display control device of the present invention has at least the display control unit 11 of the controller 10.

The display control unit 11 controls the display screen image of the display 2. When a touch manipulation is sensed by the display 2, the display control unit 11 accepts a manipulation command that corresponds to the position or type of touch manipulation performed in regard to the display screen image. The display control unit 11 generates an image that represents an operation state of the environment temperature control device 3. The display control unit 11 outputs, to the display 2, a control command for displaying a screen image including the generated image. The operation state of the environment temperature control device 3 is displayed so as to be identifiable by the occupant due to a change in shape, color, pattern, or animation of the image included in the screen image. The display control unit 11 also outputs the accepted manipulation command to the environment temperature control unit 12.

The environment temperature control unit 12 controls the environment temperature control device 3 based on the manipulation command accepted by the display control unit 11. The manipulation command includes an apparatus to be controlled from among the apparatuses included in the environment temperature control device 3, an operation mode of the apparatus to be controlled, a factor to be controlled pertaining to the apparatus to be controlled, and a control quantity for the item to be controlled. The environment temperature control unit 12 controls the apparatus to be controlled in accordance with the operation mode, the item to be controlled, and the level of control. Additionally, the environment temperature control unit 12 manages the operation state of the environment temperature control device 3 and an environment inside the vehicle cabin. The environment temperature control device 3 has operation modes including automatic mode and manual mode. When the environment temperature control device 3 is operating in automatic mode, the environment temperature control unit 12 generates a control command for causing the environment temperature control device 3 to operate such that the entire vehicle cabin or the occupant seat space reaches a set temperature, based on detection results from a temperature sensor, a humidity sensor, or the like, and outputs the generated control command to the environment temperature control device 3. However, when the environment temperature control device 3 is operating in manual mode, the environment temperature control unit 12 generates a control command for causing the environment temperature control device 3 to operate in accordance with a set item set by the occupant and outputs the generated control command to the environment temperature control device 3.

A case in which the seat heater 31 is operating in manual mode shall be given as an example. The environment temperature control unit 12 specifies a control item pertaining to the seat heater 31 from the manipulation command and controls an on/off state of the seat heater 31, a heat generation temperature of the seat heater 31, and other variables in accordance with the specified control item. The environment temperature control unit 12 outputs a control command that corresponds to the control item to the seat heater 31. The control item is determined in advance according to the temperature setting, the heat generation quantity, and other specifications of the seat heater 31.

A case in which the seat air conditioner 32 is operating in manual mode shall be given as another example. The environment temperature control unit 12 specifies a control item pertaining to the seat air conditioner 32 from the manipulation command and controls an on/off state of the seat air conditioner 32, a set temperature and airflow volume of the seat air conditioner 32, and other variables in accordance with the specified control item. The environment temperature control unit 12 outputs a control command that corresponds to the control item to the seat air conditioner 32. The control item is determined in advance according to the airflow volume setting, the temperature setting, and other specifications of the seat air conditioner 32. In the present embodiment, the seat heater 31 and the seat air conditioner 32 do not operate simultaneously and are selected alternatively according to the touch manipulation. However, the seat heater 31 and the seat air conditioner 32 can operate simultaneously in accordance with the specifications of the seat air conditioner 32. For example, if the seat air conditioner 32 is provided with a warm-air function for blowing out warm air in addition to a cool-air function for blowing out the cool air, the environment temperature control unit 12 can cause the seat heater 31 and the seat air conditioner 32 to operate simultaneously in accordance with a control item.

A case in which the steering wheel heater 33 is operating in manual mode shall be given as another example. The environment temperature control unit 12 specifies a control item pertaining to the steering wheel heater 33 from the manipulation command and controls an on/off state of the steering wheel heater 33, a heat generation temperature of the steering wheel heater 33, and other variables in accordance with the specified control item. The environment temperature control unit 12 outputs a control command that corresponds to the control item to the steering wheel heater 33. The control item is determined in advance according to the temperature setting, the heat generation quantity, and other specifications of the steering wheel heater 33.

A case in which the air conditioning apparatus 34 is operating in manual mode shall be given as another example. The environment temperature control unit 12 specifies a control item pertaining to the air conditioning apparatus 34 from the manipulation command and controls an on/off state of the air conditioning system, an airflow volume, temperature, and airflow direction of an airflow being blown out from the air outlet, and other variables in accordance with the specified control item. The environment temperature control unit 12 outputs a control command that corresponds to the control item to the air conditioning apparatus 34. The control item is determined in advance according to the airflow volume setting, the airflow direction setting, the temperature setting, the selection of air outlet, and other specifications of the air conditioning apparatus 34.

Control over the environment temperature control apparats 3 by the environment temperature control unit 12 and control over the display screen image by the display control unit 11 are associated with one another by an application (software). The display control unit 11 accepts the manipulation command according to the touch manipulation performed in regard to the display screen image, and the environment temperature control unit 12 outputs a control item that corresponds to the manipulation command to the environment temperature control device 3 as a control command. Additionally, for example, when operation of the environment temperature control device 3 is changed by the environment temperature control unit 12 in accordance with the environment inside the vehicle cabin in a state in which the environment temperature control device 3 is operating in automatic mode, the environment temperature control unit 12 outputs a signal indicating the changed operation state of the environment temperature control device 3 to the display control unit 11. The display control unit 11 generates an image indicating a current operation state of the environment temperature control device 3 based on the signal from the environment temperature control unit 12. The display control unit 11 outputs, to the display 2, a control command for displaying the generated image. This makes it possible for the occupant to manipulate the environment temperature control device 3 using the display 2 and to verify the operation state of the environment temperature control device 3 from the display screen image of the display 2. Additionally, when the operation state of the environment temperature control device 3 is changed automatically using automatic mode, it is possible for the occupant to verify the change in the operation state of the environment temperature control device 3 from the display screen image of the display 2.

A method for controlling the environment temperature control device 3 using the display 2, and the display screen image of the display 2, are described below with reference to FIGS. 3 to 9. Each of FIGS. 3 to 9 is an example of a display screen image displayed on the display 2. As shown in FIGS. 3 to 9, the display screen image of the display 2 is horizontally elongated, but the shape of the display 2 and the shape of the display screen image of the display 2 are not limited to horizontally elongated shapes. Additionally, in FIGS. 3 to 9, an x axis represents a vehicle widthwise direction (left-right direction), a y axis represents depth in the vehicle advancement direction (progress direction), and a z axis represents a height direction (up-down direction).

Figure 3:
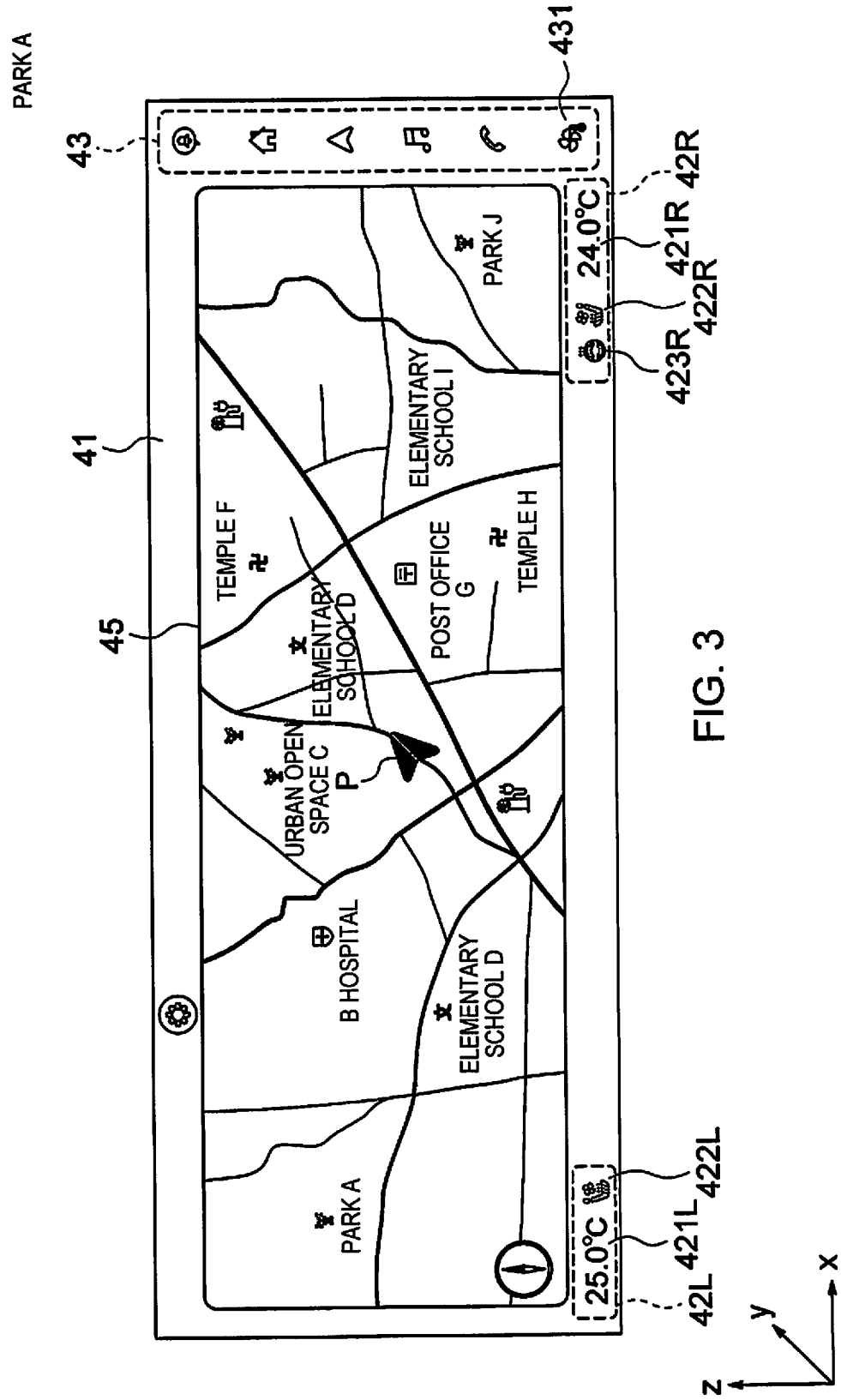
FIG. 3 is an example of a home screen image displayed on the display in FIG. 1.

FIG. 3 is an example of a home screen image displayed on the display 2. For example, when an ignition switch of the vehicle is turned on by the occupant, a signal indicating that the vehicle has started up is inputted to the display control unit 11. The display control unit 11 reads image data that represents a home screen image from the memory. The display control unit 11 outputs, to the display 2, a control command for displaying the image data read from the memory. The home screen image includes a passenger-seat icon associated with the passenger seat and a driver's-seat icon associated with the driver's seat; these icons shall be described later. Additionally, as in the example in FIG. 3, the home screen image 41 is not limited to a screen image that is displayed first after the vehicle has started up; a screen image displayed while the vehicle is stopped or traveling can also be employed. When another system different from the environment temperature control system 1 starts up due to a manipulation performed by the occupant, the display control unit 11 outputs, to the display 2, a control command for displaying a home screen image including a screen image that corresponds to the system during start-up. In the example in FIG. 3, a navigation screen image 45 in which a current-location icon P is superposed on map information is displayed in the home screen image 41. The current-location icon P is an icon indicating a current position of the vehicle. The home screen image 41 in FIG. 3 is employed in a scenario in which a navigation system starts up due to a manipulation performed by the occupant and road guidance is issued to the driver using the navigation system. Additionally, for example, when an audio system starts up due to a manipulation performed by the occupant, the display control unit 11 outputs, to the display 2, a control command for displaying a home screen image including a music information screen image. The music information screen image indicates information pertaining to music being played inside the vehicle cabin using the audio system. The type of screen image included in the home screen image is determined in advance according to specifications of the vehicle.

As shown in FIG. 3, the home screen image 41 includes a passenger-seat icon 42L, a driver's-seat icon 42R, a menu section 43, and a navigation screen image 45. The navigation screen image 45 is a main screen image that is positioned approximately at the center of the home screen image 41 and occupies a majority of the display screen image of the display 2. The passenger-seat icon 42L and the driver's-seat icon 42R, together with icons included in the menu section 43, are icons that can be manipulated through touch by the occupant and differ in application for each icon. The passenger-seat icon 42L is used for displaying a passenger seat settings screen image (described later). The driver's-seat icon 42R is used for displaying a driver's seat settings screen image (described later). An air-conditioning icon 431 included in the menu section 43 is used for displaying an air-conditioning settings screen image (described later). The home screen image 41 in FIG. 3 is provided by way of example, but the main screen image of the home screen image 41 is not limited to the navigation screen image 45. There are no particular limitations as to the number of screen images included in the home screen image 41; as a difference from the example in FIG. 3, the home screen image 41 can include two screen images divided into two in a z-axis direction.

The passenger-seat icon 42L is associated with the passenger seat and is positioned on the home screen image 41 so as to be below the navigation screen image 45 and closer to the passenger seat than to the driver's seat. As shown in FIG. 3, the passenger-seat icon 42L includes a set temperature displayed depiction 421L and an operation state displayed depiction 422L. The set temperature displayed depiction 421L is positioned leftward of the operation state displayed depiction 422L and represents a set temperature within the passenger seat settings screen image. The operation state displayed depiction 422L represents an operation state (state of being on or off) of the seat temperature control apparatus 30 of the passenger seat. Specifically, the passenger-seat icon 42L represents the operation state of the seat temperature control apparatus 30 of the passenger seat within the passenger seat settings screen image. In the example in FIG. 3, images showing the seat heater 31 and the seat air conditioner 32 of the passenger seat are displayed in a gray color as the operation state displayed depiction 422L. In the operation state displayed depiction 422L, display colors of an icon section that represents a fan and an icon section that represents heat radiated by the seat heater change in accordance with the operation state of the seat heater 31 and the seat air conditioner 32. For example, in a case in which the seat heater 31 is in operation, the icon section that represents the fan within the operation state displayed depiction 422L is displayed in an orange color, and in a case in which the seat heater 31 is stopped, said icon section is displayed in the gray color. Additionally, for example, in a case in which the seat air conditioner 32 is in operation, the icon section that represents the fan within the operation state displayed depiction 422L is displayed in a blue color, and in a case in which the seat air conditioner 32 is stopped, said icon section is displayed in the gray color. In the example shown in FIG. 3, the operation state displayed depiction 422L represents that the seat heater 31 and the seat air conditioner 32 are both off. In a state in which the seat temperature control apparatus 30 of the passenger seat is operating in automatic mode, if the operation of the seat temperature control apparatus 30 of the passenger seat is changed by the environment temperature control unit 12 in accordance with the environment temperature inside the vehicle cabin, the display control unit 11 outputs, to the display 2, a control command for changing the operation state displayed depiction 422L in accordance with the changed operation state of the seat temperature control apparatus 30. In the example in FIG. 3, for example, if the seat heater 31 of the passenger seat is switched from off to on using automatic mode, a control command for changing the icon section that represents the fan within the operation state displayed depiction 422L from the gray color to the orange color is outputted to the display 2. This makes it possible for the occupant to easily ascertain a change in the operation state of the seat temperature control apparatus 30 of the passenger seat that is brought about in automatic mode. In particular, because the passenger-seat icon 42L is positioned closer to the passenger seat than to the driver's seat on the home screen image 41 as in the example in FIG. 3, it is possible for the passenger-seat occupant to easily ascertain the change in the operation state of the seat temperature control apparatus 30 of the passenger seat, and it is possible to improve visibility of the operation state of the seat temperature control apparatus 30. The passenger-seat icon 42L shown in FIG. 3 is merely one example of a display form in which settings content pertaining to the seat temperature control apparatus 30 of the passenger seat is displayed, and in no way limits the display form of the passenger-seat icon 42L.

The passenger-seat icon 42L and the driver's-seat icon 42R are positioned so as to approximately have line symmetry with respect to a center line of the home screen image 41 that is parallel to the z-axis. The driver's-seat icon 42R is associated with the driver's seat and is positioned on the home screen image 41 so as to be below the navigation screen image 45 and closer to the driver's seat than to the passenger seat. As shown in FIG. 3, the driver's-seat icon 42R includes a set temperature displayed depiction 421R, an operation state displayed depiction 422R, and an operation state displayed depiction 423R. The set temperature displayed depiction 421R is positioned rightward of the operation state displayed depictions 422R, 423R and represents a set temperature within the driver's seat settings screen image. The operation state displayed depiction 422R is positioned rightward of the operation state displayed depiction 423R and represents an operation state (state of being on or off) of the seat temperature control apparatus 30 of the driver's seat. The operation state displayed depiction 423R represents an operation state (state of being on or off) of the steering wheel heater 33. The operation state displayed depiction 423R is included in the driver's-seat icon 42R but is not included in the passenger-seat icon 42L. The driver's-seat icon 42R represents the operation state of the seat temperature control apparatus 30 of the driver's seat within the driver's seat settings screen image. A display form of the set temperature displayed depiction 421R and a display form of the set temperature displayed depiction 421L are the same; therefore, reference should be made to the description given previously. Additionally, although display forms of the operation state displayed depictions 422 differ from each other in that the icon that represents a seat in the set temperature displayed depiction 421R is displayed facing a direction opposite that of the icon that represents a seat in the set temperature displayed depiction 421L, the display forms of the operation state displayed depictions 422 are otherwise the same as the display form of the set temperature displayed depiction 421L; therefore, reference should be made to the description given previously. The operation state displayed depiction 422R in FIG. 3 represents that the seat heater 31 and the seat air conditioner 32 of the driver's seat are both off. In the example in FIG. 3, an icon that represents the steering wheel heater 33 is displayed in the gray color as the operation state displayed depiction 423R. While the steering wheel heater 33 is on, the operation state displayed depiction 423R is displayed in the orange color, and while the steering wheel heater 33 is off, the operation state displayed depiction 423R is displayed in the gray color. In the example in FIG. 3, the operation state displayed depiction 423R represents that the steering wheel heater 33 is off. Additionally, if the operation state of the seat temperature control apparatus 30 and/or the steering wheel heater 33 of the driver's seat is changed using automatic mode, the display control unit 11 outputs, to the display 2, a control command for changing the operation state displayed depictions 422R, 423R in the same manner as with the seat temperature control apparatus 30 of the passenger seat. In the example in FIG. 3, for example, if the steering wheel heater 33 of the driver's seat is switched from off to on using automatic mode, a control command for changing the color of an image that represents the steering wheel heater 33 from the gray color to the orange color is outputted to the display 2. This makes it possible for the occupant to easily ascertain a change in the operation state of the seat temperature control apparatus 30 and/or the steering wheel heater 33 of the driver's seat that is brought about in automatic mode. In particular, because the driver's-seat icon 42R is positioned closer to the driver's seat than to the passenger seat on the home screen image 41 as in the example in FIG. 3, it is possible for the driver to easily ascertain the change in the operation state of the seat temperature control apparatus 30 and the steering wheel heater 33 of the driver's seat, and it is possible to improve the visibility of the operation state of the seat temperature control apparatus 30 and the steering wheel heater 33.

The menu section 43 is a portion for displaying menus that can be selected by the occupant. In the menu section 43, a plurality of icons including the air-conditioning icon 431 are lined up in the z-axis direction. The menu section 43 is positioned on the home screen image 41 so as to be rightward of the navigation screen image 45 and closer to the driver's seat than to the passenger seat. The air-conditioning icon 431 is associated with the air conditioning apparatus 34 and is positioned lowermost in the menu section 43. There are no particular limitations as to the number and application of other icons that are included in the menu section 43, excluding the air-conditioning icon 431. The number and application of icons included in the menu section 43 is determined in advance according to the specifications of the vehicle.

An operation of the display control unit 11 when icons including the passenger-seat icon 42L, the driver's-seat icon 42R, and the air-conditioning icon 431 shown in FIG. 3 are manipulated through touch shall be described next. The display control unit 11 outputs a control command that differs according to the type of icon that is manipulated through touch to the display 2 and causes the display 2 to display a screen image associated with the icons. When one seat icon from among the passenger-seat icon 42L and the driver's-seat icon 42R is manipulated, the display control unit 11 outputs, to the display 2, a control command for displaying a settings screen image pertaining to one seat from among the seats associated with the passenger-seat icon 42L and the driver's-seat icon 42R. The settings screen image includes a displayed depiction via which a control item relating to temperature control pertaining to the one seat icon that is manipulated in the home screen image 41 can be inputted by the occupant. Additionally, the settings screen image is positioned closer to the one seat than to the other seat from among the passenger seat and the driver's seat on the display screen image of the display 2. When the air-conditioning icon 431 is manipulated, the display control unit 11 outputs, to the display 2, a control command for switching from displaying the home screen image 41 to displaying an air conditioning settings screen image.

The passenger seat settings screen image that is displayed on the display 2 when the occupant performs a touch manipulation on the passenger-seat icon 42L shall now be described. When the occupant performs a touch manipulation on the passenger-seat icon 42L, the display control unit 11 detects a position on the home screen image 41 at which the touch manipulation is performed and recognizes that the detected position corresponds to the position of the passenger-seat icon 42L. The touch manipulation performed in regard to the passenger-seat icon 42L includes a touch manipulation performed in regard to the set temperature displayed depiction 421L and a touch manipulation performed in regard to the operation state displayed depiction 422L. When the touch manipulation is performed in regard to either of the set temperature displayed depiction 421L and the operation state displayed depiction 422L, the display control unit 11 recognizes that the touch manipulation is performed in regard to the passenger-seat icon 42L. The display control unit 11 reads image data pertaining to the passenger seat settings screen image from the memory. The display control unit 11 outputs, to the display 2, a control command (second control command L) for displaying the image data pertaining to the passenger seat settings screen image that is read from the memory. In the present embodiment, the second control command L includes a control command for displaying the passenger seat settings screen image superposed on the home screen image 41. Additionally, the second control command L includes a control command for displaying the passenger seat settings screen image at a position covering the passenger-seat icon 42L. Furthermore, when a current-location icon P is displayed on the home screen image 41 as in the example shown in FIG. 3, the second control command L includes a control command for displaying the current-location icon P in a region within the home screen image 41 on which the passenger seat settings screen image is not superposed. Additionally, the second control command L includes a control command for reducing a brightness of the home screen image 41 in comparison with that before the passenger seat settings screen image is displayed.

Figure 4:
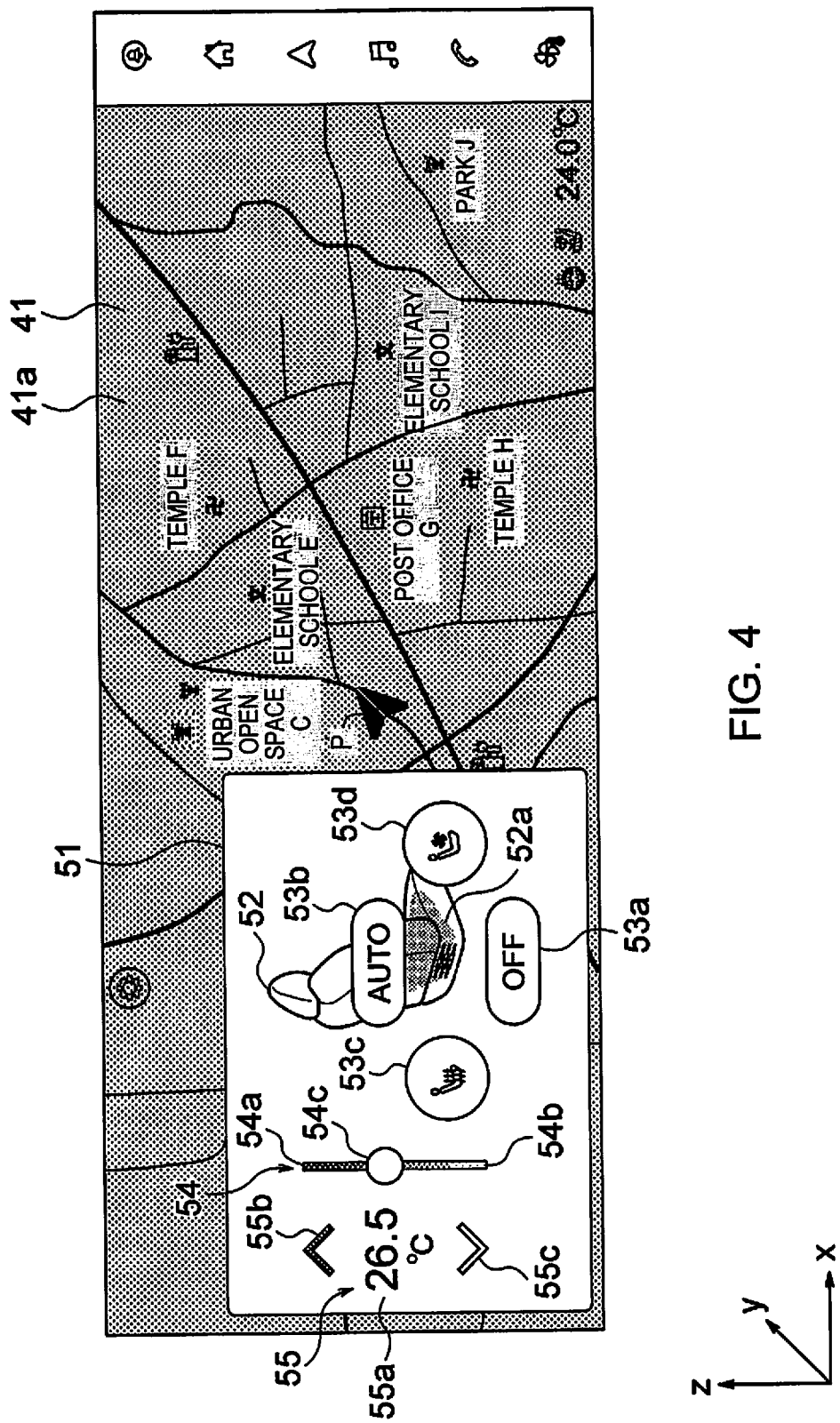
FIG. 4 is an example of a passenger seat settings screen image displayed on the display in FIG. 1 when a passenger-seat icon within the home screen image in FIG. 3 is manipulated.

FIG. 4 is an example of the passenger seat settings screen image 51 displayed on the display 2 when the passenger-seat icon 42L within the home screen image 41 in FIG. 3 is manipulated through touch. The passenger seat settings screen image 51 is used for enabling the occupant to set the seat temperature control apparatus 30 of the passenger seat. The passenger seat settings screen image 51 is displayed within a new window generated on the home screen image 41. The passenger seat settings screen image 51 is smaller than the home screen image 41 and is larger than the passenger-seat icon 42L shown in FIG. 3. Additionally, the passenger seat settings screen image 51 is positioned closer to the passenger seat than to the driver's seat on the display screen image of the display 2. Moreover, the passenger seat settings screen image 51 is displayed superposed on the home screen image 41 so as to cover the passenger-seat icon 42L within the home screen image 41. The home screen image 41 has a region 41a on which the passenger seat settings screen image 51 is not superposed. The brightness of the home screen image 41 shown in FIG. 4 is lower than the brightness of the home screen image 41 shown in FIG. 3. There are no particular limitations as to the absolute value of the brightness of the home screen image 41 shown in FIG. 4, provided that said absolute value is reduced relative to the brightness of the home screen image 41 shown in FIG. 3. Reducing the brightness of the home screen image 41 relatively emphasizes the passenger seat settings screen image 51 and facilitates verification of display content pertaining to the passenger seat settings screen image 51 by the occupant. The current-location icon P on the navigation screen image 45 is displayed in the region 41a of the home screen image 41. The current-location icon P shown in FIG. 4 corresponds to the current-location icon P shown in FIG. 3. The driver can easily ascertain the current location of the vehicle using the current-location icon P even when the passenger seat settings screen image 51 is displayed. In particular, it is possible to minimize instances in which the driver becomes unable to ascertain the current location of the vehicle while driving due to display of the passenger seat settings screen image 51 and driving performed by the driver is affected.

The passenger seat settings screen image 51 includes a seat image 52 that represents the passenger seat, a main switch button displayed depiction 53a, a mode switch button displayed depiction 53b, a seat heater button displayed depiction 53c, a seat air conditioner button displayed depictions 53d, a temperature adjustment bar 54, and a temperature display image 55. The button displayed depictions, bar, and images are displayed depictions via which control items relating to temperature control for the passenger seat can be inputted by the occupant. The seat image 52 is displayed so as to be rotated by a prescribed angle (e.g., within a range of 10 to 45 degrees) from the actual passenger seat in a clockwise manner from the vehicle advancement direction with the z axis as a central axis. The main switch button displayed depiction 53a is used for switching the seat temperature control apparatus 30 of the passenger seat on and off using a touch manipulation. Characters on this button displayed depiction are white while the button displayed depiction is off, and the white-character portions are orange while the button displayed depiction is on. In the descriptions below, characters on the other button displayed depictions are displayed in white and orange in the same manner according to whether the button displayed depictions are on or off. The mode switch button displayed depiction 53b is used for switching between operation modes (automatic mode/manual mode) of the seat temperature control apparatus 30 of the passenger seat. The seat heater button displayed depiction 53c is used for switching the seat heater 31 on and off using a touch manipulation. The seat air conditioner button displayed depiction 53d is used for switching the seat air conditioner 32 on and off using a touch manipulation. The seat heater button displayed depiction 53c is displayed using an icon that represents the seat heater 31, and the seat air conditioner button displayed depiction 53d is displayed using an icon that represents the seat air conditioner 32, therefore making it possible for the occupant to identify the apparatuses that can be manipulated using the buttons. Some or all of these button displayed depictions are displayed superposed on the seat image 52.

The seat image 52 also includes an operation state image 52a that represents the operation state of the seat temperature control apparatus 30 of the passenger seat. The operation state image 52a includes a gradated displayed depiction. The gradated displayed depiction represents a level of heat radiated by the seat heater 31 of the passenger seat or a level of airflow volume produced by the seat air conditioner 32 of the passenger seat. In the example in FIG. 4, the gradated displayed depiction represents three gradated portions, but there are no particular limitations as to the number of gradations. A display form of the operation state image 52a changes in accordance with manipulations performed in regard to the operation state image 52a and the button displayed depictions by the occupant. For example, if the occupant touches the seat heater button displayed depiction 53c, the display control unit 11 outputs, to the display 2, a control command for changing a color of the operation state image 52a from a preceding display color to a red color and changes the color of the operation state image 52a to the red color. The red color represents the heat radiated by the seat heater 31. The display control unit 11 changes the gradated displayed depiction of the operation state image 52a in accordance with a number of times the occupant touches the operation state image 52a. For example, when the occupant touches the operation state image 52a a plurality of times, the display control unit 11 outputs, to the display 2, a control command for augmenting the red gradated displayed depiction in a positive z-axis direction such that the number of gradations in the gradated displayed depiction is interrelated with the number of times the operation state image 52a is touched. Additionally, for example, when the occupant touches the seat air conditioner button displayed depiction 53d, the display control unit 11 outputs, to the display 2, a control command for changing the color of the operation state image 52a from the preceding display color to a blue color and changes the color of the operation state image 52a to the blue color. The blue color represents air blown by the seat air conditioner 32. For example, when the occupant touches the operation state image 52a a plurality of times, the display control unit 11 outputs, to the display 2, a control command for augmenting the blue gradated displayed depiction in the positive z-axis direction such that the number of gradations in the gradated displayed depiction is interrelated with the number of times the operation state image 52a is touched. Because the display form of the operation state image 52a changes in this manner according to manipulation performed by the occupant, the occupant can, through visual observation, easily ascertain the level of heat radiated by the seat heater 31 of the passenger seat or the level of airflow volume produced by the seat air conditioner 32 of the passenger seat. In particular, because the operation of the seat heater 31 is displayed using a red color and the operation of the seat air conditioner 32 is displayed using a blue color, the occupant can intuitively ascertain an apparatus that is operating from the display color of the operation state image 52a, therefore making it possible to improve the visibility of the operation state image 52a. The display form of the operation state image 52a and the method for controlling the display form that are described using FIG. 4 are provided by way of example; other display forms and methods for controlling the display form can be used.

The temperature adjustment bar 54 shall be described next. As shown in FIG. 4, the temperature adjustment bar 54 is displayed leftward of the seat image 52. The temperature adjustment bar 54 has an image of a line segment that follows the z axis and a button displayed depiction 54c that can move on the line segment. An upper end 54a of the image of the line segment is displayed in a red color, and a lower end 54b of the image of the line segment is displayed in a blue color. In FIG. 4, dots are used in lieu of colors. Additionally, dots are similarly used in lieu of colors for the temperature adjustment bar shown in FIGS. 5 and 6. The image of the line segment is a gradient displayed depiction that changes from red to blue from the upper end 54a toward the lower end 54b. The button displayed depiction 54c on the line segment can move due to a touch manipulation such as tapping, swiping, and flicking. When the button displayed depiction 54c moves toward the upper end 54a of the line due to the touch manipulation, the set temperature of the environment temperature control device 3 of the passenger seat in automatic mode increases. However, when the button displayed depiction 54c moves toward the lower end 54b of the line segment due to the touch manipulation, the set temperature of the environment temperature control device 3 of the passenger seat in automatic mode decreases. The set temperature of the environment temperature control device 3 of the passenger seat changes according to the position of the button displayed depiction 54c included in the temperature adjustment bar 54. The temperature adjustment bar 54 is an adjustment icon for adjusting the set temperature in a passenger-seat space. Specifically, when the temperature adjustment bar 54 is manipulated using an upward touch manipulation, the environment temperature control unit 12 outputs a control command for raising the set temperature of the environment temperature control device 3 of the passenger seat, and when the temperature adjustment bar 54 is manipulated using a downward touch manipulation, the environment temperature control unit 12 outputs a control command for lowering the set temperature of the environment temperature control device 3 of the passenger seat. This makes it possible for the occupant to easily change the set temperature of the environment temperature control device 3 of the passenger seat using a touch manipulation on the display 2. Additionally, because the upper end 54a and lower end 54b of the temperature adjustment bar 54 are differentiated using red and blue colors, the occupant can easily ascertain, from the passenger seat settings screen image, a direction in which the touch manipulation should be performed in order to raise or lower the temperature.

When the button displayed depiction 54c included in the temperature adjustment bar 54 is manipulated using a directional touch manipulation, a unit of change in the set temperature can be changed in accordance with a manipulation speed of the directional touch manipulation. The unit of change in the set temperature is set in advance in multiple stages; for example, the unit of change is set in advance to 0.5° C. and 1.0° C. or another increment. If a movement speed of the button displayed depiction 54c is equal to or less than a prescribed speed threshold value, the environment temperature control unit 12 sets the unit of change in the set temperature (amount of change in temperature per unit) to a minimum unit (0.5° C.). If the movement speed of the button displayed depiction 54c is greater than the prescribed speed threshold value, the environment temperature control unit 12 sets the unit of change in the set temperature (amount of change in temperature per unit) to a unit higher than the minimum unit (e.g., 1.0° C.). For example, if the occupant manipulates the button displayed depiction 54c by swiping, the amount of change in the set temperature increases with respect to a movement amount of the button displayed depiction 54c caused by the swiping when the movement speed of the button displayed depiction 54c caused by the swiping is high. However, when the movement speed of the button displayed depiction 54c using the same touch operation of swiping is low, the amount of change in the set temperature decreases even if the amount of movement of the button caused by the swiping is the same. Specifically, the amount of change in the set temperature changes according to a difference in movement speed even if the movement amount of the button displayed depiction 54c is the same. Because the unit of change in the set temperature increases as the movement speed of the touch manipulation increases, a breadth of change in the set temperature also increases. This makes it possible to adjust the unit of change in the set temperature using the movement speed of the button displayed depiction 54c caused by the directional touch operation, therefore making it possible to easily adjust the temperature.

The temperature display image 55 shall be described next. As shown in FIG. 4, the temperature display image 55 is displayed leftward of the temperature adjustment bar 54. The temperature display image 55 has a temperature meter 55a, an up button displayed depiction 55b, and a down button displayed depiction 55c. The temperature meter 55a indicates a current set temperature. The up button displayed depiction 55*b* is used for increasing the set temperature, and the down button displayed depiction 55*c* is used for reducing the set temperature. If the up button displayed depiction 55*b* is touched once, the set temperature rises by a prescribed unit of change (e.g., 0.5° C.). If the down button displayed depiction 55*c* is touched once, the set temperature falls by the prescribed unit of change (e.g., 0.5° C.). The up button displayed depiction 55*b* is displayed in a red color, and the down button displayed depiction 55*c* is displayed in a blue color. This makes it possible for the occupant to verify the current set temperature and to easily change the set temperature of the environment temperature control device 3 of the passenger seat using a touch manipulation performed in regard to the passenger seat settings screen image 51. Additionally, because the up button displayed depiction 55*b* and the down button displayed depiction 55*c* are differentiated using red and blue colors, the occupant can easily ascertain, from the passenger seat settings screen image 51, which button should be touched in order to raise or lower the temperature. The subjects that are controlled according to the set temperatures of the temperature adjustment bar 54 and the temperature display image 55 can exclude the seat heater 31 and the seat air conditioner 32, provided that said subjects include at least the air conditioning apparatus 34.

The window that displays the passenger seat settings screen image 51 is controlled by the display control unit 11 so as to close due to a prescribed condition being met. For example, if a given time elapses after display of the passenger seat settings screen image 51 (if the passenger seat settings screen image 51 has timed out), or if the region 41*a* of the home screen image 41 is manipulated through touch by the occupant, the display control unit 11 outputs, to the display 2, a control command for closing the passenger seat settings screen image 51 and a control command for returning the brightness of the home screen image 41 to the brightness from before the passenger seat settings screen image 51 was displayed. The passenger seat settings screen image 51 is thereby closed, and the home screen image 41 shown in FIG. 3 is displayed on the display 2. While the passenger seat settings screen image 51 is displayed, the displayed depictions on the home screen image 41 are controlled independently from the passenger seat settings screen image 51 by the display control unit 11. When the current-location icon P is displayed on the home screen image 41 as in the example in FIG. 4, the display control unit 11 outputs, to the display 2, a control command for changing the display position of the current-location icon P in accordance with movement of the vehicle even after the passenger seat settings screen image 51 is displayed. This makes it possible for the driver to drive while verifying the navigation screen image 45 both before and after the passenger seat settings screen image 51 is displayed.

The driver's seat settings screen image that is displayed on the display 2 when the occupant performs a touch manipulation on the driver's-seat icon 42R shown in FIG. 3 shall be described next. When the occupant performs a touch manipulation on the driver's-seat icon 42R, the display control unit 11 detects a position on the home screen image 41 at which the touch manipulation is performed and recognizes that the detected position corresponds to the position of the driver's-seat icon 42R. The touch manipulation performed in regard to the driver's-seat icon 42R includes a touch manipulation performed in regard to the set temperature displayed depiction 421R, a touch manipulation performed in regard to the operation state displayed depiction 422R, and a touch manipulation performed in regard to the operation state displayed depiction 423R. When the touch manipulation is performed in regard to any of the set temperature displayed depiction 421R, the operation state displayed depiction 422R, and the operation state displayed depiction 423R, the display control unit 11 recognizes that the touch manipulation is performed in regard to the driver's-seat icon 42R. The display control unit 11 reads image data pertaining to the driver's seat settings screen image (described later) from the memory. The display control unit 11 outputs, to the display 2, a control command (second control command R) for displaying the image data that is read from the memory. In the present embodiment, the second control command R includes a control command for displaying the driver's seat settings screen image superposed on the home screen image 41. Additionally, the second control command R includes a control command for displaying the driver's seat settings screen image at a position covering the driver's-seat icon 42R. Furthermore, when the current-location icon P is displayed on the home screen image 41, the second control command R includes a control command for displaying the current-location icon P in a region within the home screen image 41 on which the driver's seat settings screen image is not superposed, in the same manner as with the passenger seat settings screen image. Additionally, the second control command R includes a control command for reducing the brightness of the home screen image 41 in comparison with that before the driver's seat settings screen image is displayed.

Figure 5:
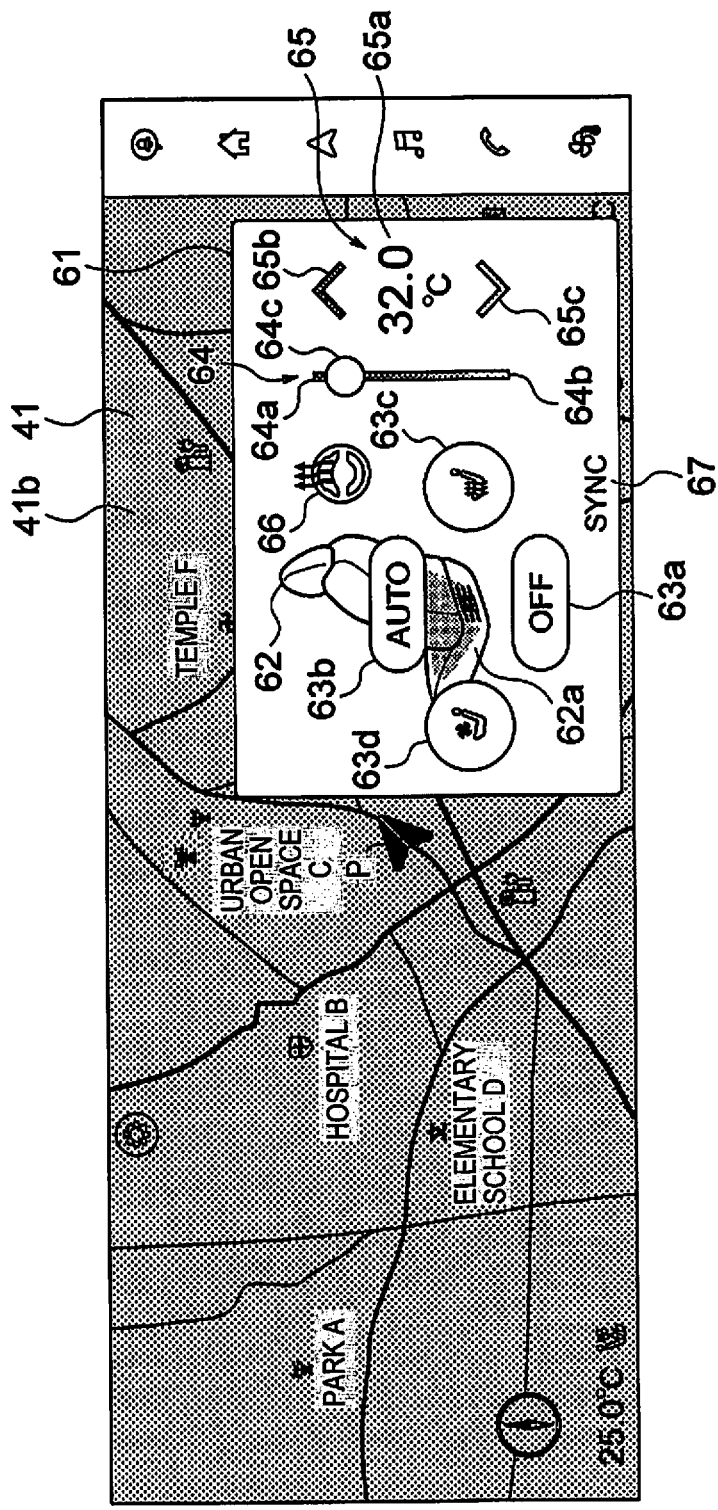
FIG. 5 is an example of a driver's seat settings screen image displayed on the display in FIG. 1 when a driver's-seat icon within the home screen image in FIG. 3 is manipulated.

FIG. 5 is an example of the driver's seat settings screen image 61 displayed on the display 2 when the driver's-seat icon 42R within the home screen image 41 shown in FIG. 3 is manipulated through touch. The driver's seat settings screen image 61 is used for enabling the occupant to set the seat temperature control apparatus 30 of the driver's seat. The driver's seat settings screen image 61 is displayed within a new window generated on the home screen image 41. The driver's seat settings screen image 61 is smaller than the home screen image 41 and is larger than the driver's-seat icon 42R shown in FIG. 3. The driver's seat settings screen image 61 is the same size as the passenger seat settings screen image 51 shown in FIG. 4. Additionally, the driver's seat settings screen image 61 is positioned closer to the driver's seat than to the passenger seat on the display screen image of the display 2. Moreover, the driver's seat settings screen image 61 is displayed superposed on the home screen image 41 so as to cover the driver's-seat icon 42R within the home screen image 41. The home screen image 41 has a region 41*b* on which the driver's seat settings screen image 61 is not superposed. The brightness of the home screen image 41 shown in FIG. 5 is lower than the brightness of the home screen image 41 shown in FIG. 3. In the same manner as with the home screen image 41 shown in FIG. 4, there are no particular limitations as to the absolute value of the brightness of the home screen image 41 shown in FIG. 5, provided that said absolute value is reduced relative to the brightness of the home screen image 41 shown in FIG. 3. Reducing the brightness of the home screen image 41 relatively emphasizes the driver's seat settings screen image 61 and facilitates verification of display content pertaining to the driver's seat settings screen image 61 by the occupant. The current-location icon P on the navigation screen image 45 is displayed in the region 41*b* of the home screen image 41. The current-location icon P shown in FIG. 5 corresponds to the current-location icon P shown in FIG. 3. The driver can easily ascertain the current location of the vehicle using the current-location icon P even when the driver's seat settings screen image 61 is displayed.

The driver's seat settings screen image 61 includes a seat image 62 that represents the driver's seat, a main switch button displayed depiction 63a, a mode switch button displayed depiction 63b, a seat heater button displayed depiction 63c, a seat air conditioner button displayed depiction 63d, a temperature adjustment bar 64, a temperature display image 65, a steering wheel heater button displayed depiction 66, and a synchronization switch button displayed depiction 67. The button displayed depictions, bar, and images, with the exception of the synchronization switch button displayed depiction 67, are displayed depictions via which control items relating to temperature control for the driver's seat can be inputted by the occupant. The seat image 62 is displayed so as to be rotated by a prescribed angle (e.g., within a range of 10 to 45 degrees) from the actual driver's seat in a counterclockwise manner from the vehicle advancement direction with the z axis as a central axis. The main switch button displayed depiction 63a is used for switching the seat temperature control apparatus 30 of the driver's seat on and off using a touch manipulation. The mode switch button displayed depiction 63b is used for switching between operation modes (automatic mode/manual mode) of the seat temperature control apparatus 30 of the driver's seat. The seat heater button displayed depiction 63c is used for switching the seat heater 31 on and off using a touch manipulation. The seat air conditioner button displayed depiction 63d is used for switching the seat air conditioner 32 on and off using a touch manipulation. The steering wheel heater button displayed depiction 66 is displayed between the seat image 62 and the temperature adjustment bar 64 and is used for switching the steering wheel heater 33 on and off using a touch manipulation. Some or all of these button displayed depictions are displayed superposed on the seat image 62. In the driver's seat settings screen image 61, the button displayed depictions excluding the steering wheel heater button displayed depiction 66 and the synchronization switch button displayed depiction 67 are arranged so as to have line symmetry with respect to the z axis in relation to the arrangement of the button displayed depictions in the passenger seat settings screen image 51. The driver's seat settings screen image 61 differs from the passenger seat settings screen image 51 shown in FIG. 4 in that the former includes the steering wheel heater button displayed depiction 66 and the synchronization switch button displayed depiction 67. The steering wheel heater button displayed depiction 66 is not displayed in the passenger seat settings screen image 51 shown in FIG. 4. Reference should be made to the descriptions given in regard to FIG. 4 as pertains to the configurations shared with the passenger-seat settings screen image 51.

The synchronization switch button displayed depiction 67 shall be described next. The synchronization switch button displayed depiction 67 is capable of synchronizing the operation of the seat temperature control apparatus 30 of the driver's seat and the operation of the seat temperature control apparatus 30 of the passenger seat. When the synchronization switch button displayed depiction 67 is on, an occupant can manipulate the display content pertaining to the driver's seat settings screen image 61 to thereby operate not only the seat temperature control apparatus 30 of the driver's seat but also the seat temperature control apparatus 30 of the passenger seat. For example, in circumstances where the passenger-seat occupant cannot manipulate the passenger seat settings screen image 51, such as when the passenger-seat occupant is asleep, the driver can turn on the synchronization switch button displayed depiction 67 to manipulate the seat temperature control apparatus 30 of the passenger seat. An instance in which the driver performs a touch manipulation on the passenger-seat icon 42L (see FIG. 3) and manipulates the seat temperature control apparatus 30 of the passenger seat from the passenger seat settings screen image 51 (see FIG. 4) can be prevented; therefore, the driver can easily operate the seat temperature control apparatus 30 of the passenger seat. In particular, because instances in which the driver is allowed to perform an unnecessary manipulation while driving can be prevented, any burden imposed on the driver can be reduced. However, when the synchronization switch button displayed depiction 67 is off, the occupant cannot manipulate the seat temperature control apparatus 30 of the passenger seat merely by manipulating the seat temperature control apparatus 30 of the driver's seat, even if the display content pertaining to the driver's seat settings screen image 61 is manipulated. The steering wheel heater 33 is provided only to the driver's seat, and therefore the occupant can manipulate the steering wheel heater 33 from the steering wheel heater button displayed depiction 66 irrespective of whether the synchronization switch button displayed depiction 67 is on or off.

The window that displays the driver's seat settings screen image 61 is controlled by the display control unit 11 so as to close due to a prescribed condition being met. For example, if a given time elapses after display of the driver's seat settings screen image 61 (if the driver's seat settings screen image 61 has timed out), or if the region 41b of the home screen image 41 is manipulated through touch by the occupant, the display control unit 11 outputs, to the display 2, a control command for closing the driver's seat settings screen image 61 and a control command for returning the brightness of the home screen image 41 to the brightness from before the driver's seat settings screen image 61 was displayed. The driver's seat settings screen image 61 is thereby closed, and the home screen image 41 shown in FIG. 3 is displayed on the display 2. While the driver's seat settings screen image 61 is displayed, the displayed depictions on the home screen image 41 are controlled independently from the driver's seat settings screen image 61 by the display control unit 11 in the same manner as when the passenger seat settings screen image 51 is displayed.

The air conditioning settings screen image that is displayed on the display 2 when the occupant performs a touch manipulation on the air-conditioning icon 431 shown in FIG. 3 shall be described next. When the occupant performs a touch manipulation on the air-conditioning icon 431, the display control unit 11 detects a position on the home screen image 41 at which the touch manipulation is performed and recognizes that the detected position corresponds to the position of the air-conditioning icon 431. The display control unit 11 reads image data pertaining to the air conditioning settings screen image (described later) from the memory. The display control unit 11 outputs, to the display 2, a control command (third control command) for displaying the image data that is read from the memory. The third control command is a control command for switching the display screen image of the display 2 from the home screen image 41 to the air conditioning settings screen image.

Figure 6:
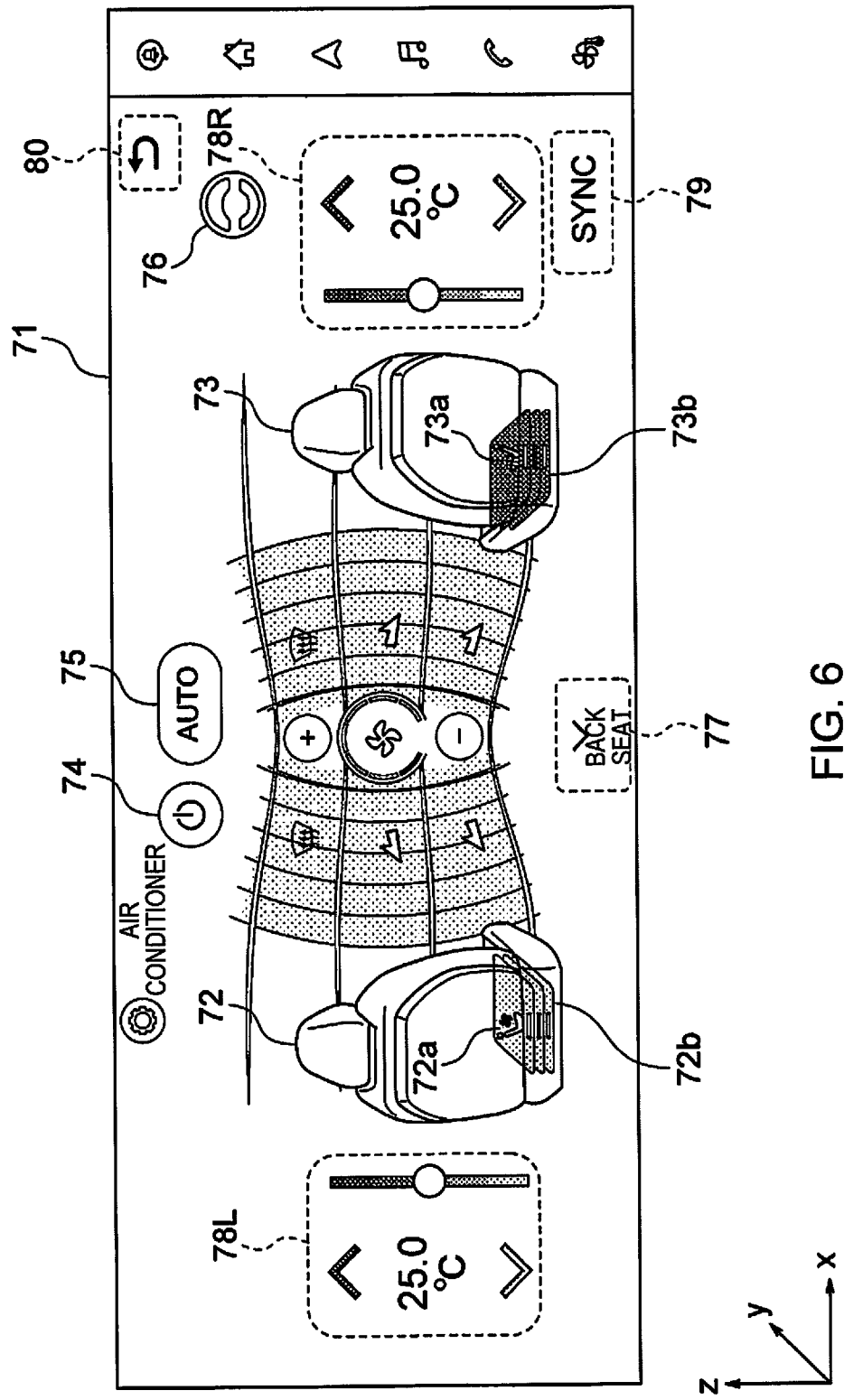
FIG. 6 is an example of an air conditioning settings screen image displayed on the display in FIG. 1 when an air-conditioning icon within the home screen image in FIG. 3 is manipulated.

FIG. 6 is an example of the air conditioning settings screen image 71 displayed on the display 2 when the air-conditioning icon 431 within the home screen image 41 in FIG. 3 is manipulated through touch. The air conditioning settings screen image 71 is used for enabling the occupant to set the air conditioning apparatus 34. The air conditioning settings screen image 71 is the same size as the home screen image 41 shown in FIG. 3. When the air conditioning settings screen image 71 is displayed, the home screen image 41 is not displayed on the display 2. This example thus differs from the examples in FIGS. 4 and 5.

The air conditioning settings screen image 71 includes a seat image 72 that represents the passenger seat, a seat image 73 that represents the driver's seat, a main switch button displayed depiction 74, a mode switch button displayed depiction 75, a steering wheel heater button displayed depiction 76, a back-seat icon 77, temperature adjustment sections 78R, 78L, a synchronization switch button displayed depiction 79, and a "go back" icon 80. Button displayed depictions or icons by which the occupant can manipulate the airflow volume and airflow direction of the air conditioning apparatus 34 are present between the seat image 72 and the seat image 73, although no detailed description is given for these button displayed depictions or icons. The occupant can manipulate the button displayed depictions or icons arranged between the seat image 72 and the seat image 73, or manipulate the temperature adjustment sections 78R, 78L, to thereby manipulate at least one from among the airflow volume, the airflow direction, and the set temperature of the air conditioning apparatus 34 with respect to the passenger seat and the driver's seat.

The main switch button displayed depiction 74 is used for switching the air conditioning apparatus 34 on and off using a touch manipulation. The mode switch button displayed depiction 75 is used for switching between operation modes (automatic mode/manual mode) of the air conditioning apparatus 34. The steering wheel heater button displayed depiction 76 is used for switching the steering wheel heater 33 on and off using a touch manipulation. The back-seat icon 77 is used for displaying a back seat settings screen image (described later). The temperature adjustment section 78R is used for adjusting the temperature in a driver's-seat-side seat space, and the temperature adjustment section 78L is used for adjusting the temperature in a passenger-seat-side seat space. Each of the temperature adjustment section 78R and the temperature adjustment section 78L is configured from a temperature adjustment bar that is similar to the temperature adjustment bar 54 in FIG. 4 (and the temperature adjustment bar 64 in FIG. 5) and a temperature display image that is similar to the temperature display image 55 in FIG. 4 (and the temperature adjustment image 65 in FIG. 5); therefore, reference should be made to the descriptions given previously as pertains to, inter alia, a method for manipulating the temperature adjustment sections 78R, 78L. The synchronization switch button displayed depiction 79 is a switch for synchronizing and adjusting a driver's-seat airflow oriented from the air conditioning apparatus 34 toward the driver's seat and a passenger-seat airflow oriented from the air conditioning apparatus 34 toward the passenger seat. The "go back" icon 80 is a screen image for returning the display screen image of the display 2 to the screen image from before the air conditioning settings screen image 71 was displayed. When the "go back" icon 80 is touched, the display control unit 11 outputs, to the display 2, a control command for returning the display screen image to the screen image from before the air conditioning settings screen image 71 was displayed.

The seat image 72 includes operation state images 72a, 72b that represent the operation state of the seat temperature control apparatus 30 of the passenger seat. The seat image 72 is displayed so as to be rotated by a prescribed angle from the seat image 52 shown in FIG. 4 in a counterclockwise manner from the vehicle advancement direction with the z axis as a central axis, and so as to be rotated by a prescribed angle from the actual passenger seat in a clockwise manner from the vehicle advancement direction with the z axis as a center. In the operation state image 72a, an image that represents the seat heater 31 or an image that represents the seat air conditioner 32 is switched in accordance with the apparatus that is operating. In the operation state image 72b, an image that represents the level of heat radiated by the seat heater 31 or an image that represents the level of airflow volume produced by the seat air conditioner 32 is switched so as to be interrelated with the level of heat radiated by the seat heater 31 or the level of airflow volume produced by the seat air conditioner 32. For example, if the level of heat radiated by the seat heater 31 rises by one level using automatic mode, the display control unit 11 outputs, to the display 2, a control command for augmenting gradations in the operation state image 72b by one unit. Additionally, in the operation state image 72b, a display color is switched to a red color that represents the heat radiated by the seat heater 31 or a blue color that represents the air blown by the seat air conditioner 32 in accordance with the apparatus that is operating, in the same manner as with the operation state image 52a illustrated in FIG. 4. When the seat image 72 is manipulated through touch, the display control unit 11 displays a second passenger seat settings screen image that is different from the passenger seat settings screen image 51 shown in FIG. 4. The second passenger seat settings screen image shall be described later.

The seat image 73 includes operation state images 73a, 73b that represent the operation state of the seat temperature control apparatus 30 of the driver's seat. The seat image 73 is displayed so as to be rotated by a prescribed angle from the seat image 62 shown in FIG. 5 in a clockwise manner from the vehicle advancement direction with the z axis as a central axis, and so as to be rotated by a prescribed angle from the actual driver's seat in a counterclockwise manner from the vehicle advancement direction with the z axis as a center. The operation state images 73a, 73b are similar to the operation state images 72a, 72b, except that the interrelated apparatus is changed to the seat temperature control apparatus 30 of the driver's seat; therefore, reference should be made to the description given previously. When the seat image 73 is manipulated through touch, the display control unit 11 displays, on the display 2, a second driver's seat settings screen image that is different from the driver's seat settings screen image 61 shown in FIG. 5. The second driver's seat settings screen image shall be described later.

The second passenger seat settings screen image that is displayed on the display 2 when the occupant performs a touch manipulation on the seat image 72 shown in FIG. 6 shall be described next. When the occupant performs a touch manipulation on the seat image 72, the display control unit 11 detects a position on the air conditioning settings screen image 71 at which the touch manipulation is performed and recognizes that the detected position corresponds to the position of the seat image 72. The display control unit 11 reads the second passenger seat settings screen image (described later) from the memory. The display control unit 11 outputs, to the display 2, a control command (fourth control command L) for displaying image data that is read from the memory. The fourth control command L includes a control command for reducing a brightness of the air conditioning settings screen image 71 in comparison with that before the second passenger seat settings screen image is displayed.

Figure 7:
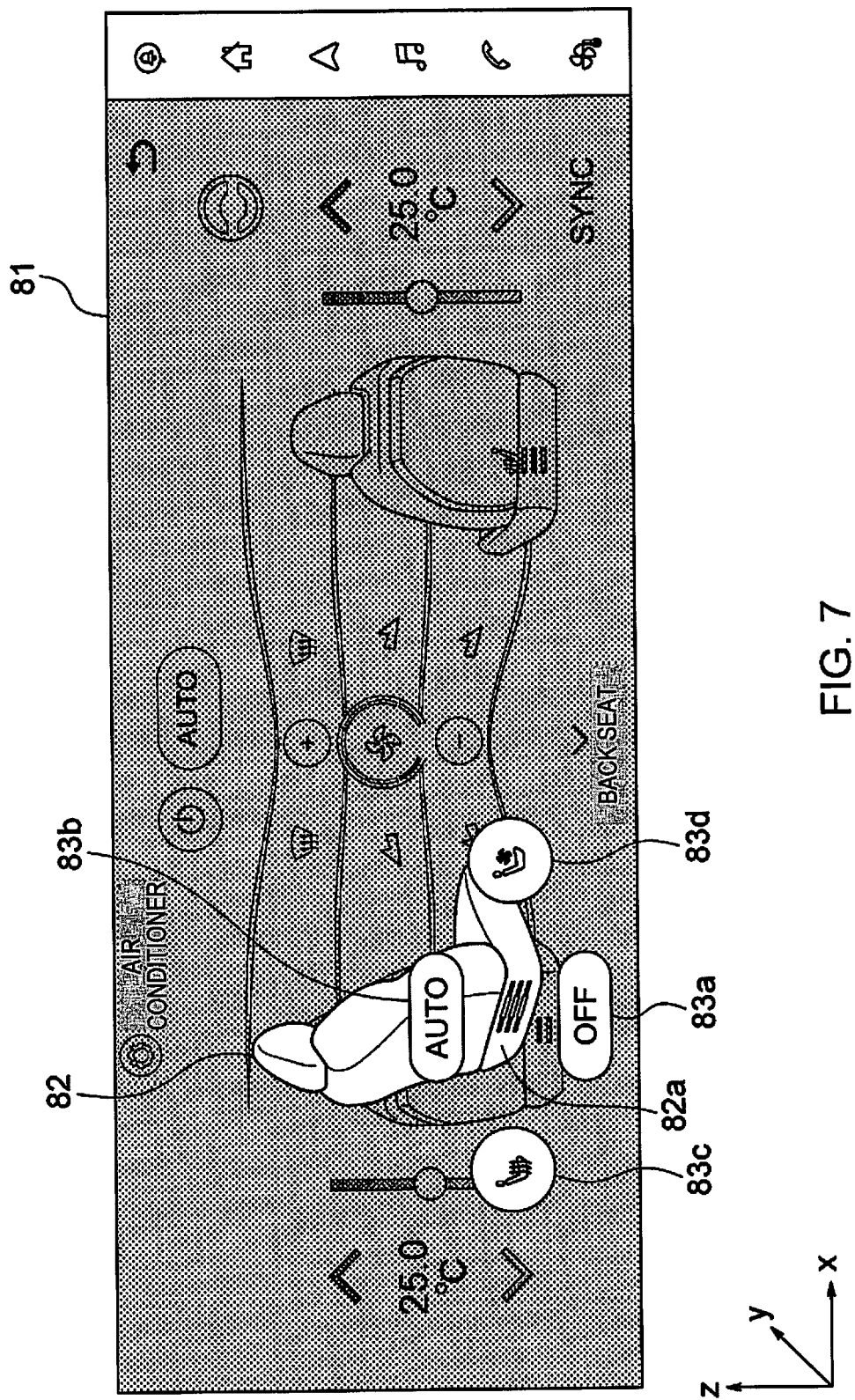
FIG. 7 is an example of a second passenger seat settings screen image displayed on the display in FIG. 1 when a passenger seat image within the air conditioning settings screen image in FIG. 6 is manipulated.

FIG. 7 is an example of the second passenger seat settings screen image 81 displayed on the display 2 when the seat image 72 within the air conditioning settings screen image 71 shown in FIG. 6 is manipulated through touch. The second passenger seat settings screen image 81 is used for enabling the occupant to set the seat temperature control apparatus 30 of the passenger seat. The second passenger seat settings screen image 81 is the same size as the air conditioning settings screen image 71 shown in FIG. 6. In the example in FIG. 7, an air conditioning settings screen image having lower brightness than the air conditioning settings screen image 71 in FIG. 6 is displayed, but the air conditioning settings screen image can instead not be displayed when the second passenger seat settings screen image 81 is displayed.

The second passenger seat settings screen image 81 includes a seat image 82 that represents the passenger seat, a main switch button displayed depiction 83a, a mode switch button displayed depiction 83b, a seat heater button displayed depiction 83c, and a seat air conditioner button displayed depiction 83d. The image and button displayed depictions are displayed depictions via which control items pertaining to the seat temperature control apparatus 30 of the passenger seat can be inputted by the occupant. The seat image 82 (including an operation state image 82a), the main switch button displayed depiction 83a, the mode switch button displayed depiction 83b, the seat heater button displayed depiction 83c, and the seat air conditioner button displayed depiction 83d respectively correspond to the seat image 52 (including the operation state image 52a), the main switch button displayed depiction 53a, the mode switch button displayed depiction 53b, the seat heater button displayed depiction 53c, and the seat air conditioner button displayed depiction 53d shown in FIG. 4. As was described using FIG. 4, the occupant can manipulate the button displayed depictions and image to thereby manipulate the seat temperature control apparatus 30 of the passenger seat. Additionally, the seat in the seat image 82 changes direction relative to the seat image 72 shown in FIG. 6; therefore, the occupant can easily ascertain, according to the change in direction of the seat, that the seat temperature control apparatus 30 of the passenger seat can be manipulated. Reference should be made to the descriptions given in regard to FIG. 4 as pertains to display forms of the button displayed depictions and the operation state image 82a, as well as a method for manipulation by the occupant. The second passenger seat settings screen image 81 does not include display content that corresponds to the temperature adjustment bar 54 and the temperature display image 55 within the passenger seat settings screen image 51 shown in FIG. 4. When the seat temperature control apparatus 30 of the passenger seat is operating in automatic mode, the occupant can manipulate the temperature adjustment bar and temperature display image that are included in the temperature adjustment section 78L shown in FIG. 6 to thereby control the operation of the seat temperature control apparatus 30 of the passenger seat in automatic mode.

The second driver's seat settings screen image that is displayed on the display 2 when the occupant performs a touch manipulation on the seat image 73 shown in FIG. 6 shall be described next. When the occupant performs a touch manipulation on the seat image 73, the display control unit 11 detects a position on the air conditioning settings screen image 71 at which the touch manipulation is performed and recognizes that the detected position corresponds to the position of the seat image 73. The display control unit 11 reads the second driver's seat settings screen image (described later) from the memory. The display control unit 11 outputs, to the display 2, a control command (fourth control command R) for displaying image data that is read from the memory. The fourth control command R includes a control command for reducing the brightness of the air conditioning settings screen image 71 in comparison with that before the second driver's seat settings screen image is displayed.

Figure 8:
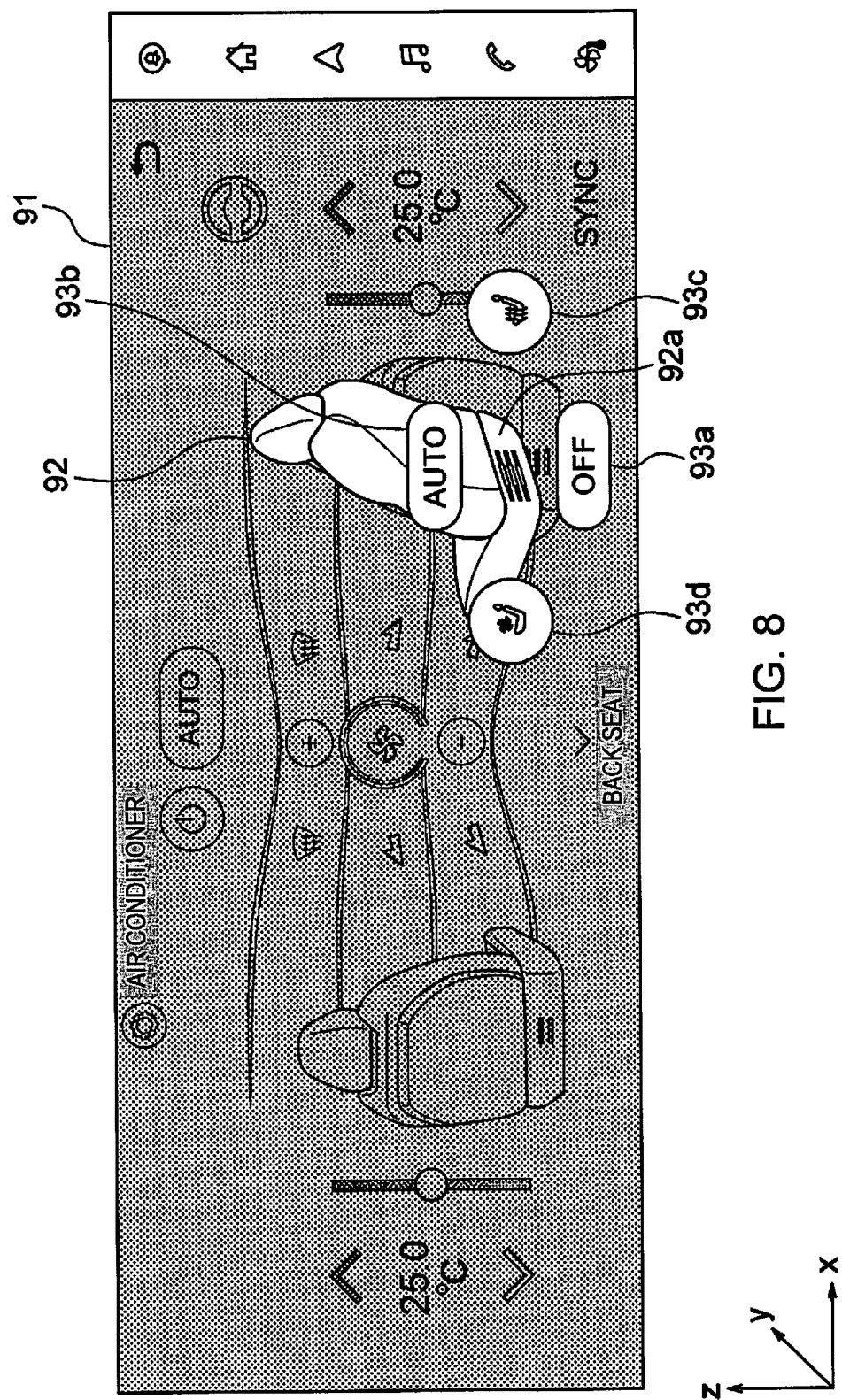
FIG. 8 is an example of a second driver's seat settings screen image displayed on the display in FIG. 1 when a driver's seat image within the air conditioning settings screen image in FIG. 6 is manipulated.

FIG. 8 is an example of the second driver's seat settings screen image 91 displayed on the display 2 when the seat image 73 within the air conditioning settings screen image 71 in FIG. 6 is manipulated through touch. The second driver's seat settings screen image 91 is used for enabling the occupant to set the seat temperature control apparatus 30 of the driver's seat. The second driver's seat settings screen image 91 is the same size as the air conditioning settings screen image 71 shown in FIG. 6. In the example in FIG. 8, an air conditioning settings screen image having lower brightness than the air conditioning settings screen image 71 in FIG. 6 is displayed, but the air conditioning settings screen image can instead not be displayed when the second driver's seat settings screen image 91 is displayed.

The second driver's seat settings screen image 91 includes a seat image 92 that represents the driver's seat, a main switch button displayed depiction 93a, a mode switch button displayed depiction 93b, a seat heater button displayed depiction 93c, and a seat air conditioner button displayed depiction 93d. The image and button displayed depictions are displayed depictions via which control items pertaining to the seat temperature control apparatus 30 of the driver's seat can be inputted by the occupant. The seat image 92 (including an operation state image 92a), the main switch button displayed depiction 93a, the mode switch button displayed depiction 93b, the seat heater button displayed depiction 93c, and the seat air conditioner button displayed depiction 93d respectively correspond to the seat image 62 (including the operation state image 62a), the main switch button displayed depiction 63a, the mode switch button displayed depiction 63b, the seat heater button displayed depiction 63c, and the seat air conditioner button displayed depiction 63d shown in FIG. 5. As was described using FIG. 5, the occupant can manipulate the button displayed depictions and image to thereby manipulate the seat temperature control apparatus 30 of the driver's seat. Additionally, the seat in the seat image 92 changes direction relative to the seat image 73 shown in FIG. 6; therefore, the occupant can easily ascertain, according to the change in direction of the seat, that the seat temperature control apparatus 30 of the driver's seat can be manipulated. Reference should be made to the descriptions given in regard to FIG. 5 as pertains to display forms of the button displayed depictions and the operation state image 92a, as well as a method for manipulation by the occupant. In the same manner as with the second passenger seat settings screen image 81 shown in FIG. 7, the second driver's seat settings screen image 91 does not include display content that corresponds to the temperature adjustment bar 64 and the temperature display image 65 within the driver's seat settings screen image 61 shown in FIG. 5. When the seat temperature control apparatus 30 of the driver's seat is operating in automatic mode, the occupant can manipulate the temperature adjustment bar and temperature display image that are included in the temperature adjustment section 78R shown in FIG. 6 to thereby control the operation of the seat temperature control apparatus 30 of the driver's seat in automatic mode.

The back seat settings screen image that is displayed on the display 2 when the occupant performs a touch manipulation on the back-seat icon 77 shown in FIG. 6 shall be described next. When the occupant performs a touch manipulation on the back-seat icon 77, the display control unit 11 detects a position on the air conditioning settings screen image 71 at which the touch manipulation is performed and recognizes that the detected position corresponds to the position of the back-seat icon 77. The display control unit 11 reads the back seat settings screen image (described later) from the memory. The display control unit 11 outputs, to the display 2, a control command (fifth control command) for displaying image data that is read from the memory. The fifth control command includes a control command for reducing the brightness of the air conditioning settings screen image 71 in comparison with that before the back seat settings screen image is displayed.

Figure 9:
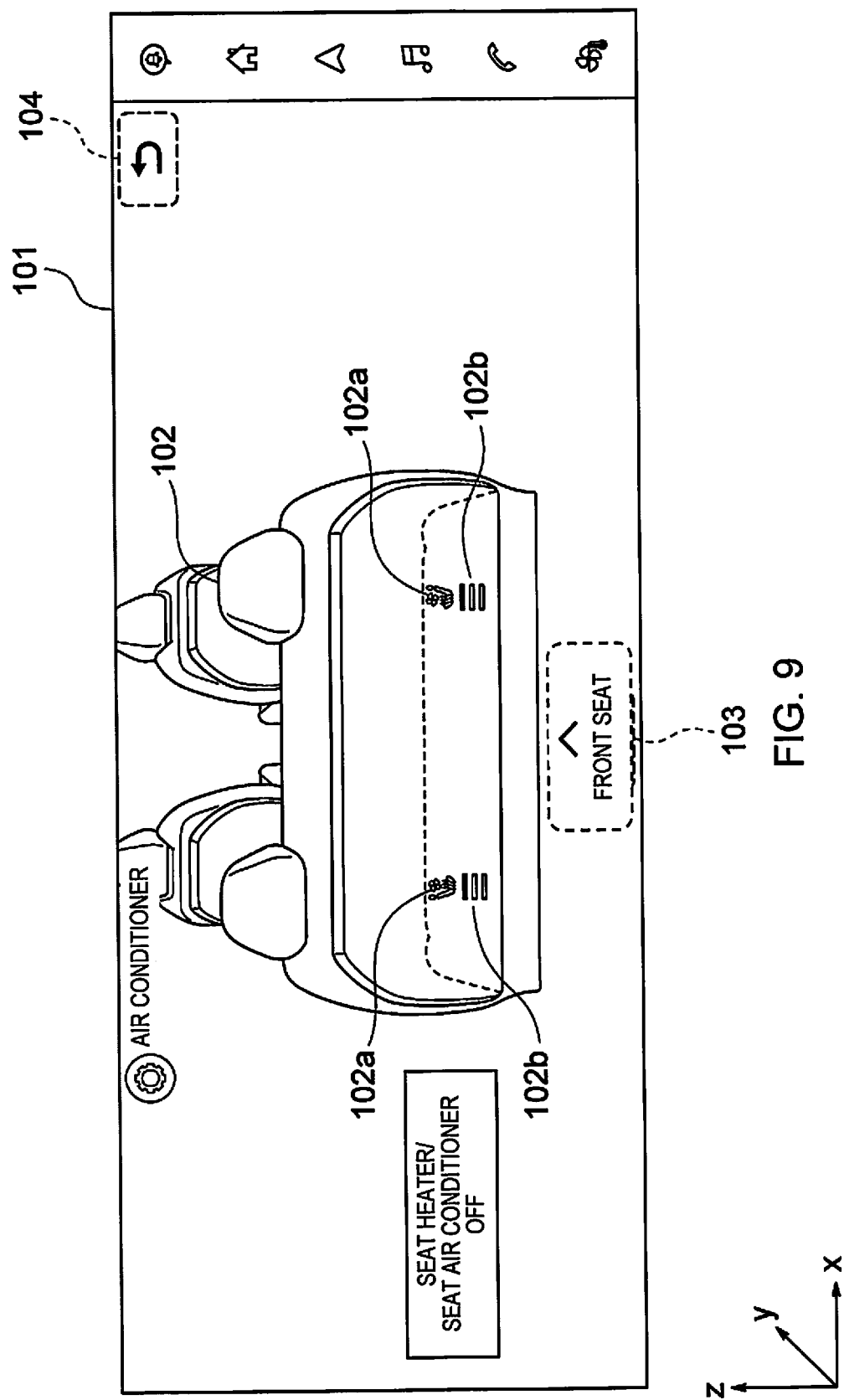
FIG. 9 is an example of a back seat settings screen image displayed on the display in FIG. 1 when a back-seat icon within the air conditioning settings screen image in FIG. 6 is manipulated.

FIG. 9 is an example of the back seat settings screen image 101 displayed on the display 2 when the back-seat icon 77 within the air conditioning settings screen image 71 in FIG. 6 is manipulated through touch. The back seat settings screen image 101 is used for enabling the occupant to set the seat temperature control apparatus 30 of the back seat. The back seat settings screen image 101 is the same size as the air conditioning settings screen image 71 shown in FIG. 6.

The back seat settings screen image 101 includes a seat image 102 that represents the back seat, a front-seat icon 103, and a "go back" icon 104. The seat image 102 includes operation state images 102a, 102b that represent the operation state of the seat temperature control apparatus 30 of the back seat. The number of operation state images 102a, 102b displayed corresponds to the number of seat temperature control apparatuses 30 of the back seat. In the back seat settings screen image 101 in FIG. 9, it is represented that two seat temperature control apparatuses 30 are provided to the back seat. In the operation state image 102a, an image that represents the seat heater 31 or an image that represents the seat air conditioner 32 is switched in accordance with the apparatus that is operating. A display form of the operation state image 102a corresponds to the display form of the operation state image 72a shown in FIG. 6; therefore, reference should be made to the description given previously. In the operation state image 102b, a display color is switched to a red color that represents the heat radiated by the seat heater 31 or a blue color that represents the air blown by the seat air conditioner 32 in accordance with the apparatus that is operating, in the same manner as with the operation state image 52a illustrated in FIG. 4. The driver or the passenger-seat occupant can perform a touch manipulation on the operation state image 102b to thereby control the seat temperature control apparatus 30 of the back seat. In the example in FIG. 9, two operation state images 102a, 102b are displayed, but two seat temperature control apparatuses 30 provided to the back seat can be operated in an interrelated manner through a touch manipulation performed in regard to one operation state image, or two seat temperature control apparatuses 30 provided to the back seat can be operated independently using each of the operation state images 102a, 102b.

The front-seat icon 103 is used for returning the display screen image of the display 2 to the air conditioning settings screen image 71 shown in FIG. 6. When the occupant performs a touch manipulation on the front-seat icon 103, the display control unit 11 outputs, to the display 2, a control command for returning the display screen image to the air conditioning settings screen image 71. The "go back" icon 104 is a screen image for returning the display screen image of the display 2 to the screen image from before the back seat settings screen image 101 was displayed. When the "go back" icon 104 is touched, the display control unit 11 outputs, to the display 2, a control command for returning the display screen image to the screen image from before the back seat settings screen image 101 was displayed.

According to the present embodiment as described above, in the environment temperature control system 1, the display control device controls the display screen image of the touch-panel display 2 that can be manipulated by the occupant from both the driver's seat and the passenger seat of the vehicle. The display control device is provided with the controller 10 that controls the display screen image of the display 2 based on the touch manipulation performed in regard to the display 2 by the occupant. The controller 10 outputs a first control command for displaying the home screen image 41 including the passenger-seat icon 42L associated with the passenger seat and the driver's-seat icon 42R associated with the driver's seat, and outputs the second control command (second control command L or second control command R) for displaying a settings screen image (passenger seat settings screen image 51 or driver's seat settings screen image 61) pertaining to one seat from among the seats associated with the passenger seat icon 42L and the driver's-seat icon 42R when one seat icon from among the passenger-seat icon 42L and the driver's-seat icon 42R is manipulated. The passenger seat settings screen image 51 includes displayed depictions (seat image 52, main switch button displayed depiction 53a, mode switch button displayed depiction 53b, seat heater button displayed depiction 53c, seat air conditioner button displayed depiction 53d, temperature adjustment bar 54, and temperature display image 55) via which control items relating to temperature control for the passenger seat can be inputted by a user, and is positioned closer to the passenger seat than to the driver's seat on the display screen image. The driver's seat settings screen image 61 includes displayed depictions (seat image 62, main switch button displayed depiction 63a, mode switch button displayed depiction 63b, seat heater button displayed depiction 63c, seat air conditioner button displayed depiction 63d, temperature adjustment bar 64, and temperature display image 65) via which control items relating to temperature control for the driver's seat can be inputted by a user, and is positioned closer to the driver's seat than to the passenger seat on the display screen image. This makes it easier for a hand of the passenger-seat occupant to reach the passenger seat settings screen image 51 from the passenger seat and makes it easier for a hand of the driver to reach the driver's seat settings screen image 61 from the driver's seat, therefore making it possible to improve manipulability even in a state in which the driver is seated in the seat. Additionally, the passenger-seat occupant readily verifies the operation state of the seat temperature control apparatus 30 of the passenger seat, and the driver readily verifies the operation state of the seat temperature control apparatus 30 of the driver's seat, therefore making it possible to improve the visibility of the operation state of the seat temperature control apparatuses 30.

In the present embodiment, the second control command L includes a control command for displaying the passenger seat settings screen image 51 superposed on the home screen image 41, and the second control command R includes a control command for displaying the driver's seat settings screen image 61 superposed on the home screen image 41. This makes it possible for the occupant to intuitively ascertain that the passenger seat settings screen image 51 or the driver's seat settings screen image 61 is displayed. In particular, the driver can, while driving, ascertain, from a peripheral field of view, that the passenger seat settings screen image 51 is displayed even while the driver steadily watches in the direction ahead of the vehicle; therefore, the driver readily ascertains that the passenger-seat occupant has manipulated the passenger-seat icon 42L.

In the present embodiment, the temperature control for the driver's seat or passenger seat includes temperature control for at least one of seat heaters 31 and seat air conditioners 32 provided to the vehicle. This makes it easier for the occupant to ascertain, from the display content of the passenger seat settings screen image 51 or the driver's seat settings screen image 61, the operation state of the seat temperature control apparatus 30 of the driver's seat or the passenger seat.

In the present embodiment, the passenger seat settings screen image 51 and the driver's seat settings screen image 61 are smaller than the home screen image 41 and are larger than the passenger-seat icon 42L and the driver's-seat icon 42R. This makes it possible for the occupant to verify the display content of the home screen image 41 displayed behind the passenger seat settings screen image 51 or the driver's seat settings screen image 61, therefore making it possible for the occupant to ascertain the display content of the home screen image 41 both before and after the passenger seat settings screen image 51 or the driver's seat settings screen image 61 is displayed. Additionally, because the passenger seat settings screen image 51 and the driver's seat settings screen image 61 are larger than the passenger-seat icon 42L and the driver's-seat icon 42R, it is possible to improve the visibility of the passenger seat settings screen image 51 and the driver's seat settings screen image 61.

In the present embodiment, map information is included in the display content in the home screen image 41. This makes it possible for the driver to drive while verifying the map information both before and after the passenger seat settings screen image 51 or the driver's seat settings screen image 61 is displayed.

In the present embodiment, when the current-location icon P indicating the current location of the vehicle is displayed on the home screen image 41, the second control command L includes a control command for displaying the current-location icon P in the region 41a of the home screen image 41 on which the passenger seat settings screen image 51 is not superposed. In the present embodiment, when the current-location icon P is displayed on the home screen image 41, the second control command R includes a control command for displaying the current-location icon P in the region 41b of the home screen image 41 on which the driver's seat settings screen image 61 is not superposed. This makes it possible for the driver to drive while verifying the current location of the vehicle both before and after the passenger seat settings screen image 51 or the driver's seat settings screen image 61 is displayed.

In the present embodiment, the second control command L includes a control command for reducing the brightness of the home screen image 41 in comparison with that before the passenger seat settings screen image 51 is displayed. Additionally, in the present embodiment, the second control command R includes a control command for reducing the brightness of the home screen image 41 in comparison with that before the driver's seat settings screen image 61 is displayed. This makes it possible to display the passenger seat settings screen image 51 or the driver's seat settings screen image 61 so as to be relatively emphasized, therefore making it easier for the occupant to ascertain the display content of the passenger seat settings screen image 51 or the driver's seat settings screen image 61. Additionally, the occupant can verify the display content of the home screen image 41 even after the passenger seat settings screen image 51 or the driver's seat settings screen image 61 is displayed.

In the present embodiment, the passenger seat settings screen image 51 does not include a displayed depiction relating to temperature control for the driver's seat. Additionally, the driver's seat settings screen image 61 does not include a displayed depiction relating to temperature control for the passenger seat. This makes it possible to reduce the number of items of display content in each settings screen image, therefore making it possible to reduce the size of the settings screen images. As a result, the occupant can verify the display content of the home screen image 41 displayed behind the passenger seat settings screen image 51 or the driver's seat settings screen image 61 while manipulating the seat temperature control apparatus 30, as shown in FIG. 4 or 5.

In the present embodiment, whereas the passenger seat settings screen image 51 does not include a displayed depiction relating to the steering wheel heater 33, the driver's seat settings screen image 61 includes the steering wheel heater button displayed depiction 66 relating to the steering wheel heater 33. This minimizes any incidence of the occupant confusing the passenger seat settings screen image 51 and the driver's seat settings screen image 61, making it possible for the occupant to easily understand which of the seat temperature control apparatus 30 of the passenger seat and the seat temperature control apparatus 30 of the driver's seat can be manipulated.

In the present embodiment, the passenger seat settings screen image 51 includes the operation state image 52a in which the operation state of the seat heater 31 and the operation state of the seat air conditioner 32 are displayed using different colors. Additionally, in the present embodiment, the driver's seat settings screen image 61 includes the operation state image 62a in which the operation state of the seat heater 31 and the operation state of the seat air conditioner 32 are displayed using different colors. This makes it possible for the occupant to easily ascertain for which apparatus from among the seat heater 31 and the seat air conditioner 32 the operation state is displayed.

In the present embodiment, the operation state images 52a, 62a represent the level of heat radiated by the seat heater 31 or the level of airflow volume produced by the seat air conditioner 32 according to a difference in the number of gradations. This makes it possible for the occupant to easily ascertain the level of heat radiated by the seat heater 31 or the level of airflow volume produced by the seat air conditioner 32 and to easily ascertain the operation state of the seat temperature control apparatus 30.

In the present embodiment, the home screen image 41 includes the air-conditioning icon 431 associated with the air conditioning apparatus 34 mounted in the vehicle. The controller 10 outputs a third control command for switching from displaying the home screen image 41 to displaying the air conditioning settings screen image 71 when the air-conditioning icon 431 is manipulated. The air conditioning settings screen image 71 includes a displayed depiction via which a control item relating to air conditioning control for the passenger seat and the driver's seat can be inputted by the occupant. This makes it possible for the occupant to manipulate the air conditioning apparatus 34 without a mechanical button, dial, or the like for manipulating the air conditioning apparatus 34 being provided to the vehicle separately from the display 2. As a result, the number of components mounted in the vehicle can be reduced, and a greater degree of freedom can be realized in layout design. Moreover, reducing the number of components makes it possible to mount a display 2 that is larger in terms of number of inches and to improve the manipulability and visibility of the display screen image.

In the present embodiment, the air-conditioning icon 431 is positioned closer to the driver's seat than to the passenger seat on the home screen image 41. This makes it easier for the hand of the driver to reach the air-conditioning icon 431 from the driver's seat and makes it possible for the driver to easily display the air conditioning settings screen image 71, therefore making it possible to improve the manipulability of the air conditioning settings screen image 71. As a result, it is possible to reduce any burden imposed on the driver during driving.

In the present embodiment, the control item relating to the air conditioning control includes at least one from among the airflow volume, the airflow direction, and the set temperature of the air conditioning apparatus 34 with respect to the passenger seat and the driver's seat. Even in circumstances where the passenger-seat occupant cannot manipulate the display 2, such as when the passenger-seat occupant is asleep while the vehicle is traveling, it is thereby possible for the driver to perform a manipulation in consideration of the passenger-seat occupant who cannot manipulate the display 2, such as lowering the airflow volume to the passenger seat.

In the present embodiment, the air conditioning settings screen image 71 includes the operation state images 72a, 72b, 72c, 72d that represent the level of heat radiated by the seat heater 31 or the level of airflow volume produced by the seat air conditioner 32 provided to the driver's seat and the passenger seat. This makes it possible for the occupant to ascertain not only the operation state of the air conditioning apparatus 34 but also the operation states of the seat temperature control apparatuses 30 of the passenger seat and the driver's seat. Because the driver can ascertain the operation states for these apparatuses using a single screen image, it is possible to reduce any burden imposed on the driver during driving.

The present embodiment described above is disclosed for the purpose of facilitating understanding of the present invention and not for the purpose of limiting the present invention. Therefore, the elements disclosed in the above embodiment include all design changes and equivalents belonging to the technical scope of the present invention.

For example, the above embodiment was described using the example of a right-hand-steering-wheel vehicle, but the display control device and display control method according to the present invention can also be applied to a left-hand-steering-wheel vehicle. No detailed description shall be given therefor, but in such a case, the arrangement of the passenger-seat icon and driver's seat icon on the home screen image, as well as the display position of the passenger seat settings screen image and the driver's seat settings screen image, are changed in conformance with the relationship in which the driver's seat and the passenger seat are disposed on the left and right.

Additionally, for example, the above embodiment was described using the example of operation state images in which the level of heat radiated by the seat heater 31 or the level of airflow volume produced by the seat air conditioner 32 is represented according to the number of gradations, but other methods can be used to represent the level of heat radiated by the seat heater 31 or the level of airflow volume produced by the seat air conditioner 32. For example, it is permissible to use operation state images in which the image changes in size in accordance with the level of heat radiated by the seat heater 31 or the level of airflow volume produced by the seat air conditioner 32. The operation state images can also be images in which the level of heat radiated by the seat heater 31 or the level of airflow volume produced by the seat air conditioner 32 is represented using a difference in size or number of graphics.

The invention claimed is:

1. A display control device for controlling a display screen image of a touch-panel display that can be manipulated by a user from both a a passenger seat and a driver's seat of a vehicle,
   the display control device comprising: a controller for controlling the display screen image based on a touch manipulation performed in regard to the touch-panel display by the user;
   the controller being configured to
   output a first control command for displaying a home screen image including a passenger-seat icon that is associated with the passenger seat and that is positioned closer to the passenger seat than to the driver's seat, the passenger-seat icon including a set temperature displayed depiction that represents a passenger-seat temperature, and a driver's-seat icon that is associated with the driver's seat and that is positioned closer to the driver's seat than to the passenger seat, the driver's-seat icon including a set temperature displayed depiction that represents a driver's-seat temperature, and
   output a second control command for displaying a passenger seat settings screen image that includes a displayed depiction via which a control item relating to temperature control for the passenger seat can be inputted by the user, closer to the passenger seat than to the driver's seat on the display screen image, when the passenger-seat icon is manipulated, and for displaying a driver's seat settings screen image that includes a displayed depiction via which a control item relating to temperature control for the driver's seat can be inputted by the user, closer to the driver's seat than to the passenger seat on the display screen image, when the driver's-seat icon is manipulated;
   the control item relating to the temperature control for the passenger seat including a temperature control item for controlling settings of an air conditioning apparatus on a passenger-seat side;
   the control item relating to the temperature control for the driver's seat includes a temperature control item for controlling settings of the air conditioning apparatus on a driver's-seat side;
   the temperature control item in the passenger seat settings screen image and the temperature control item in the driver's seat settings screen image being arranged on the display screen image so as to have bilateral symmetry;
   the home screen image including a navigation screen image including a current-location icon indicating a current location of the vehicle, and also including the passenger-seat icon and the driver's-seat icon; and
   the second control command including a control command for displaying the current-location icon in a region of the home screen image on which the passenger seat settings screen image and the driver's seat settings screen image are not superposed, for displaying the passenger seat settings screen image in a superposed manner so as to cover the passenger-seat icon when the passenger-seat icon is manipulated, and for displaying the driver's seat settings screen image in a superposed manner so as to cover the driver's-seat icon when the driver's-seat icon is manipulated.

2. The display control device according to claim 1, wherein
the second control command includes a control command for displaying at least one of the passenger seat settings screen image superposed on the home screen image and the driver's seat settings screen image superposed on the home screen image.

3. The display control device according to claim 1, wherein
the passenger seat settings screen image includes a plurality of temperature control items and the driver's seat settings screen image includes a plurality of temperature control items that are arranged on the display screen image so as to be located furthest outward.

4. The display control device according to claim 1, wherein
the passenger seat settings screen image and the driver's seat settings screen image are smaller than the home screen image and are larger than the passenger-seat icon and the driver's-seat icon.

5. The display control device according to claim 4, wherein
the home screen image includes display content having map information.

6. The display control device according to claim 4, wherein
the second control command includes a control command for reducing a brightness of the home screen image in comparison with that before the passenger seat settings screen image and the driver's seat settings screen image are displayed.

7. The display control device according to claim 1, wherein
the passenger seat settings screen image does not include the displayed depiction relating to the temperature control for the seat corresponding to the driver's-seat icon, and
the driver's seat settings screen image does not include the displayed depiction relating to the temperature control for the seat corresponding to the passenger-seat icon.

8. The display control device according to claim 1, wherein
the passenger seat settings screen image does not include a displayed depiction relating to a steering wheel heater.

9. The display control device according to claim 1, wherein
the passenger seat settings screen image and the driver's seat settings screen image each include a first operation state image in which an operation state of a seat heater and an operation state of the seat air conditioner are displayed using different colors.

10. The display control device according to claim 9, wherein
the first operation state image includes an image in which a level of heat radiated by the seat heater is represented using a difference in size or number of graphics.

11. The display control device according to claim 9, wherein
the first operation state image includes an image in which a level of airflow volume produced by the seat air conditioner is represented using a difference in size or number of graphics.

12. The display control device according to claim 1, wherein
the home screen image includes an air-conditioning icon associated with an air conditioning apparatus mounted in the vehicle,
the controller outputs, when the air-conditioning icon is manipulated, a third control command for switching from displaying the home screen image to displaying an air conditioning settings screen image, and
the air conditioning settings screen image includes a displayed depiction via which a control item relating to air conditioning control for the passenger seat and the driver's seat can be inputted by the user.

13. The display control device according to claim 12, wherein
the air-conditioning icon is positioned closer to the driver's seat than to the passenger seat on the home screen image.

14. The display control device according to claim 12, wherein
the control item relating to the air conditioning control includes at least one from among an airflow volume, an airflow direction, and a set temperature of the air conditioning apparatus with respect to the passenger seat and the driver's seat.

15. The display control device according to claim 13, wherein
the air conditioning settings screen image includes a second operation state image that represents a level of heat radiated by the seat heater or a level of airflow volume produced by the seat air conditioner provided to the driver's seat and the passenger seat.

16. A display control method executed by a controller for controlling a display screen image of a touch-panel display that can be manipulated by a user from both a passenger seat and a driver's seat of a vehicle, the controller controlling the display screen image based on a touch manipulation performed in regard to the touch-panel display by the user,
the controller outputs a first control command for displaying a home screen image including a passenger-seat icon that is associated with the passenger seat and is positioned closer to the passenger seat than to the driver's seat, the passenger-seat icon including a set temperature displayed depiction that represents a passenger-seat-side set temperature, and a driver's-seat icon that is associated with the driver's seat and is positioned closer to the driver's seat than to the passenger seat, the driver's-seat icon including a set temperature displayed depiction that represents a driver's-seat-side set temperature; and
the controller outputs a second control command for displaying a passenger seat settings screen image that includes a displayed depiction via which a control item relating to temperature control for the passenger seat can be inputted by the user, closer to the passenger seat than to the driver's seat on the display screen image, when the passenger-seat icon is manipulated, and for displaying a driver's seat settings screen image that includes a displayed depiction via which a control item relating to temperature control for the driver's seat can be inputted by the user, closer to the driver's seat than to the passenger seat on the display screen image, when the driver's-seat icon is manipulated;
the control item relating to temperature control for the passenger seat includes a temperature control item for controlling settings of an air conditioning apparatus on a passenger-seat side;

the control item relating to temperature control for the driver's seat includes a temperature control item for controlling settings of the air conditioning apparatus on a driver's-seat side;

the temperature control item in the passenger seat settings screen image and the temperature control item in the driver's seat settings screen image are arranged on the display screen image so as to have bilateral symmetry;

the home screen image includes a navigation screen image including a current-location icon indicating a current location of the vehicle, and also includes the passenger-seat icon and the driver's-seat icon; and the second control command includes a control command for displaying the current-location icon in a region of the home screen image on which the passenger seat settings screen image and the driver's seat settings screen image are not superposed, for displaying the passenger seat settings screen image in a superposed manner so as to cover the passenger-seat icon when the passenger-seat icon is manipulated, and for displaying the driver's seat settings screen image in a superposed manner so as to cover the driver's-seat icon when the driver's-seat icon is manipulated.

* * * * *